United States Patent
Haas et al.

(10) Patent No.: US 12,516,011 B2
(45) Date of Patent: Jan. 6, 2026

(54) METHOD OF PRODUCING HIGHER ALKANONES, PREFERABLY 6-UNDECANONE, AND DERIVATIVES THEREOF

(71) Applicant: Evonik Operations GmbH, Essen (DE)

(72) Inventors: Thomas Haas, Münster (DE); Christian Richter, Münster (DE); Uwe Paulmann, Lüdinghausen (DE); Anja Hecker, Münster (DE)

(73) Assignee: Evonik Operations GmbH, Essen (DE)

(*) Notice: Subject to any disclaimer, the term of this patent is extended or adjusted under 35 U.S.C. 154(b) by 775 days.

(21) Appl. No.: 17/292,857

(22) PCT Filed: Nov. 19, 2019

(86) PCT No.: PCT/EP2019/081753
§ 371 (c)(1),
(2) Date: May 11, 2021

(87) PCT Pub. No.: WO2020/104429
PCT Pub. Date: May 28, 2020

(65) Prior Publication Data
US 2021/0395179 A1    Dec. 23, 2021

(30) Foreign Application Priority Data

Nov. 20, 2018 (EP) ..................... 18207311

(51) Int. Cl.
| | | |
|---|---|---|
| *C07C 45/48* | (2006.01) | |
| *C07C 29/145* | (2006.01) | |
| *C07C 51/50* | (2006.01) | |
| *C12P 7/40* | (2006.01) | |
| *C12P 7/42* | (2006.01) | |
| *C12P 7/52* | (2006.01) | |
| *C12P 7/62* | (2022.01) | |

(52) U.S. Cl.
CPC ............ *C07C 45/48* (2013.01); *C07C 29/145* (2013.01); *C07C 51/50* (2013.01); *C12P 7/40* (2013.01); *C12P 7/42* (2013.01); *C12P 7/52* (2013.01); *C12P 7/62* (2013.01); *C07C 2521/06* (2013.01); *C07C 2523/46* (2013.01)

(58) Field of Classification Search
CPC ....... C07C 45/48; C07C 51/50; C07C 29/145; C07C 51/12; C07C 51/48; C07C 31/125; C07C 49/04; C07C 53/126; C07C 2521/06; C07C 2523/46; C12P 7/40; C12P 7/62; C12P 7/42; C12P 7/04; C12P 7/52

See application file for complete search history.

(56) References Cited

U.S. PATENT DOCUMENTS

| | | | |
|---|---|---|---|
| 3,816,524 A | 6/1974 | Grinstead | |
| 6,265,618 B1 * | 7/2001 | Zoeller | ................. C07C 45/48 |
| | | | 568/397 |
| 8,785,688 B2 | 7/2014 | Van Heiningen et al. | |
| 2013/0310608 A1 | 11/2013 | Barnicki et al. | |
| 2014/0106421 A1 * | 4/2014 | Yin | ......................... C12P 7/52 |
| | | | 435/141 |
| 2014/0322772 A1 | 10/2014 | Angenent et al. | |
| 2016/0215302 A1 * | 7/2016 | Haas | ....................... C12P 7/14 |

FOREIGN PATENT DOCUMENTS

| | | | | |
|---|---|---|---|---|
| CN | 105420168 A | | 3/2016 | |
| EP | 0259583 A2 * | | 2/1991 | ............... C02F 1/26 |
| JP | 2015-520162 A | | 7/2015 | |
| KR | 20130087298 A * | | 8/2013 | ............... C12P 7/40 |
| RU | 2016 102 684 A | | 8/2017 | |
| WO | WO 00/14052 A1 | | 3/2000 | |
| WO | WO-2009059228 A2 * | | 5/2009 | ............. C07C 51/58 |
| WO | WO-2016008979 A1 * | | 1/2016 | ............... C12P 5/02 |

OTHER PUBLICATIONS

Barker et al. 1945. "The synthesis of butyric and caproic acids from ethanol and acetic acid by Clostridium kluyveri." Proceedings of the National Academy of Sciences, 31(12), pp. 373-381 (Year: 1945).*
Alonso et al. 2008. "Hydrogen-transfer reduction of carbonyl compounds promoted by nickel nanoparticles", Tetrahedron, 64(8), pp. 1847-1852 (Year: 2008).*
Agler et al. 2012. "Chain elongation with reactor microbiomes: upgrading dilute ethanol to medium-chain carboxylates." Energy & Environmental Science, 5(8), pp. 8189-8192 (Year: 2012).*
Ostapowicz et al. 2013. "Carbon Dioxide as a C1 Building Block for the Formation of Carboxylic Acids by Formal Catalytic Hydrocarboxylation." Angewandte Chemie International Edition, 52(46), pp. 12119-12123., on IDS filed Nov. 9, 2022 (Year: 2013).*
Martak et al. 1995. "Toxicity of organic solvents used in situ in microbial fermentation". Biotechnology techniques, 9(4), 247-252. (Year: 1995).*

(Continued)

*Primary Examiner* — Terry A McKelvey
*Assistant Examiner* — Andrew T Moehlman
(74) *Attorney, Agent, or Firm* — Oblon, McClelland, Maier & Neustadt, L.L.P.

(57) ABSTRACT

A method of producing higher alkanones, preferably 6-undecanone, from ethanol and/or acetate, may include: (a) contacting the ethanol and/or acetate with at least one microorganism capable of carrying out carbon chain elongation to produce hexanoic acid and/or an ester thereof from the ethanol and/or acetate; (b) extracting the hexanoic acid and/or ester thereof from the contacting (a) using at least one extractant in an aqueous medium, the extractant including at least one alkyl-phosphine oxide and at least one C12+ alkane; or at least one trialkylamine and at least one C12+ alkane; and (c) contacting the extracted hexanoic acid and/or ester thereof from (b) with at least one ketonization catalyst and eventually a further C1 to C22 alkanoic acid under suitable reaction conditions for chemical ketonization of hexanoic acid and eventually the further alkanoic acid to a higher alkanone, preferably 6-undecanone.

20 Claims, 1 Drawing Sheet

(56) References Cited

OTHER PUBLICATIONS

Lee et al. 2015. "Ketonization of hexanoic acid to diesel-blendable 6-undecanone on the stable zirconia aerogel catalyst." Applied Catalysis A: General, 506, pp. 288-293 (Year: 2015).*

Gildemyn et al. 2017. "Upgrading syngas fermentation effluent using Clostridium kluyveri in a continuous fermentation." Biotechnology for biofuels, 10(1), 83. (Year: 2017).*

Translation of EP-0259583-A2; provided as NPL. Published 1991. Translation generated Jan. 9, 2024 (Year: 2024).*

Julia-Hernandez et al. 2017. "Remote carboxylation of halogenated aliphatic hydrocarbons with carbon dioxide". Nature, 545(7652), pp. 84-88 (Year: 2017).*

Translation of KR-20130087298-A; provided as NPL. Original published 2013 (Year: 2013).*

Muhammad Tariq Shah et al., "Selective Heterogeneous Catalytic Hydrogenation of Ketone (C=O) to Alcohol (OH) by Magnetite Nanoparticles Following Langmuir-Hinshelwood Kinetic Approach", ACS Appl. Mater. Interfaces 2015, 7, pp. 6480-6489.

Tadashi Hano et al., "Extraction Equilibria of Organic Acids with TRI-n-Octylphosphineoxide", Journal of Chemical Engineering of Japan, pp. 734-738.

Thomas G. Ostapowicz et al., "Carbon Dioxide as a $C_1$ Building Block for the Formation of Carboxylic Acids by Formal Catalytic Hydrocarboxylation", Angew. Chem. Int. Ed. 2013, 52, pp. 12119-12123.

International Search Report and Written Opinion issued Feb. 5, 2020 in PCT/EP2019/081753 filed Nov. 19, 2019, citing documents AA, AO and AT-AZ therein, 4 pages.

Extended European Search Report issued Jun. 13, 2019 in European Patent Application No. 18207311.4 filed Nov. 20, 2018, citing documents AA, AO and AT-AZ therein, 12 pages.

Jeon, B.S., et al., "In situ extractive fermentation for the production of hexanoic acid from galactitol by *Clostridium* sp. BS-1", Ensyme and Microbial Technology, vol. 53, XP028595590, 2013, pp. 143-151.

Choi, K., et al., "In situ Biphasic Extractive Fermentation for Hexanoic Acid Production from Sucrose by *Megasphaera elsdenii* NCIMB 702410", Appl Biochem Biotechnol, vol. 171, XP055095021, 2013, pp. 1094-1107.

Lee, Y., et al., "Ketonization of hexanoic acid to diesel-blendable 6-undecanone on the stable zirconia aerogel catalyst", Applied Catalysis A: General, vol. 506, XP055584303, 2015, pp. 288-293.

Weimer, P.J., et al., "Isolation, characterization, and quantification of *Clostridium kluyveri* from the bovine rumen", Appl Microbial Biotechnol, vol. 94, XP035033400, 2012, pp. 461-466.

Wasewar, K.L., et al., "Reactive Extraction of Caproic Acid Using Tri-n-butyl Phosphate in Hexanol, Octanol, and Decanol", *J. Chem. Eng. Data*, vol. 56, XP055583906, 2011, pp. 288-297.

Kertes, A.S., et al., "Extraction Chemistry of Fermentation Product Carboxylic Acids", Biotechnology and Bioengineering, vol. 28, No. 2, XP002208353, 1985, pp. 269-282.

Wang, Y., et al., "Extraction Equilibria of Monocarboxylic Acids with Trialkylphosphine Oxide", *J. Chem.Eng. Data*, vol. 46, XP055584104, 2001, pp. 831-837.

Sylvia Gildemyn et al., "Upgrading syngas fermentation effluent using *Clostridium kluyveri* in a continuous fermentation", Biotechnol Biofuels (2017) 10:83, 15 pages.

* cited by examiner

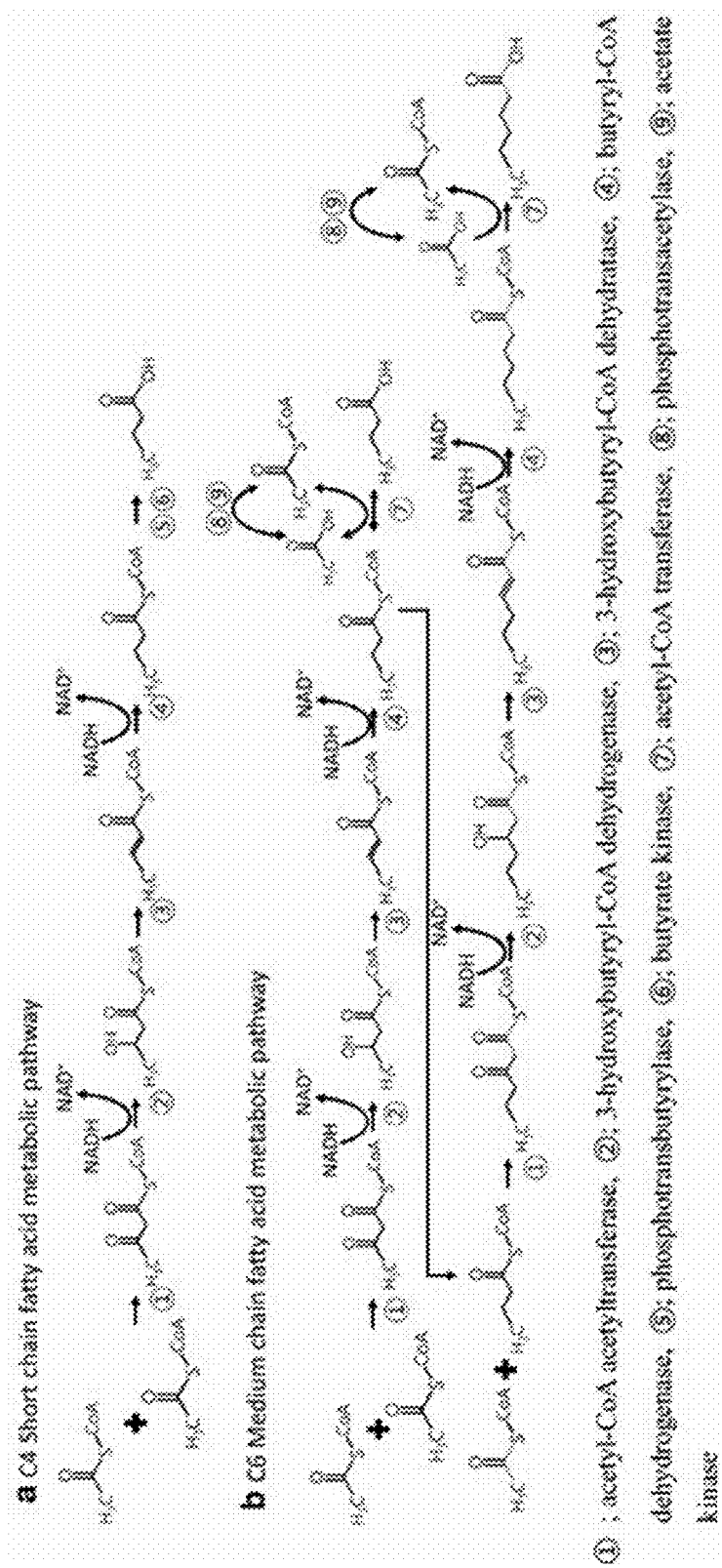

METHOD OF PRODUCING HIGHER ALKANONES, PREFERABLY 6-UNDECANONE, AND DERIVATIVES THEREOF

FIELD OF THE INVENTION

The present invention relates to a method of producing higher alkanones, preferably 6-undecanone. In particular, the present invention relates to producing higher alkanones, preferably 6-undecanone, using a combined biotechnological and chemical method.

BACKGROUND OF THE INVENTION

6-Undecanone is usually found in herbs and spices and is a constituent of *Osmanthus fragrans* (sweet *Osmanthus*). 6-undecanone is a dialkyl ketone with formula $(CH_3(CH_2)_4)_2CO$. It is especially used in the food industry as a flavour enhancer. In other industries, 6-undecanone is used as a solvent and in paints and coatings.

In industry, 6-undecanone is produced usually from a carboxylic acids by contacting the respective carboxylic acids with various metal oxide catalysts at elevated temperatures. For example, in U.S. Pat. No. 4,754,074 describes a process for the generation of dialkyl ketones using manganese dioxide supported on alumina among other examples of catalysts that may be used in the generation of diethyl ketone from propionic acid. It was well known in the art that in the preparation of ketones from carboxylic acids, other catalysts such as oxides of lead, iron, zirconium, manganese, thorium, and neodymium may be used. These catalysts may be used without a significant loss of carbons although the high pressure hydrogen gas at the high reaction temperatures of 250-450° C. are required for the process to be efficient. These conditions increase the costs of producing ketones.

Further, in all these methods practiced, the dialkyl ketone produced is always formed from a carboxylic acid as the starting material. For example, the production of 6-undecanone starts from hexanoic acid. Hexanoic acid is mainly obtained exclusively from plant and animal oils or fats. Animal fats as raw materials still meet little client acceptance and plant oils which contain short- and middle-length carboxylic acids are either difficult to obtain or are produced only in tropical regions and often also result in the destruction of rainforest. Further, particular plant and animal oil or fat raw materials have specific, but defined fatty acid profiles resulting in coupled production. It is thus difficult to obtain pure hexanoic acid as a substrate for production of 6-undecanone.

Accordingly, there is a need in the art for a more efficient means of producing 6-undecanone and other higher alkanones from other starting materials or at other starting points. In particular, there is a need in the art for a method of producing 6-undecanone from another source of raw material that enables the production to be efficient and effective.

FIGURES OF THE INVENTION

FIG. 1 shows the microbial metabolic pathway for carbon-chain elongation such as (a) butyric acid (C4) production by the genera *Clostridium* and *Butyrivibrio* (Kim B H, et al. Appl Environ Microbiol. 1984; 48(4):764-70) and (b) hexanoic acid production postulated in *Megasphaera elsdenii* and *Clostridium kluyveri* (Khan M A. Melbourne: Victoria University; 2006)

DESCRIPTION OF THE INVENTION

The present invention attempts to solve the problems above by providing a full cycle for production of higher alkanones, preferably 6-undecanone, that involves both a biotechnological and a chemical means. In particular, the production of higher alkanones, preferably 6-undecanone, starts from a simple substrate such as ethanol and/or acetate to produce hexanoic acid using a biotechnological means. The produced hexanoic acid may then be extracted and the extracted hexanoic acid subjected to a chemical step that converts the hexanoic acid to higher alkanones, preferably 6-undecanone. This method has the advantage of starting from a cheap and readily available raw material for production of higher alkanones, preferably 6-undecanone. The raw material-acetate and/or ethanol is also produced using a means that does not kill any animal or plant. Further, using the biotechnological step for producing hexanoic acid followed by the extraction step according to any aspect of the present invention results in a high and pure yield of hexanoic acid that can be then readily used for the production of higher alkanones, preferably 6-undecanone, using a chemical step.

According to one aspect of the present invention, there is provided a method of producing higher alkanones, preferably 6-undecanone, from ethanol and/or acetate, the method comprising (a) contacting the ethanol and/or acetate with at least one microorganism capable of carrying out carbon chain elongation to produce hexanoic acid and/or an ester thereof from the ethanol and/or acetate;

(b) extracting the hexanoic acid and/or ester thereof from (a) using at least one extractant in an aqueous medium, wherein the extractant comprises at least one alkyl-phosphine oxide and at least one alkane comprising at least 12 carbon atoms; or at least one trialkylamine and at least one alkane comprising at least 12 carbon atoms; and (c) contacting the extracted hexanoic acid and/or ester thereof from (b) with at least one ketonization catalyst and eventually a further alkanoic acid comprising 1 to 22 carbon atoms under suitable reaction conditions for chemical ketonization of hexanoic acid and eventually the further alkanoic acid to a higher alkanone, preferably 6-undecanone.

The term "higher alkanone/alkanol/alkanoic acid" as used herein refers to an alkanone/alkanol/alkanoic acid comprising at least six carbon atoms.

The microorganism in (a) capable of carrying out carbon chain elongation to produce the hexanoic acid may be any organism that may be capable of carbon-chain elongation according to FIG. 1 (Jeon et al. Biotechnol Biofuels (2016) 9:129). The carbon chain elongation pathway is also disclosed in Seedorf, H., et al., 2008. The microorganisms according to any aspect of the present invention may also include microorganisms which in their wild-type form are not capable of carbon chain elongation, but have acquired this trait as a result of genetic modification. In particular, the microorganism in (a) may be selected from the group consisting of *Clostridium carboxidivorans* and *Clostridium kluyveri* More in particular, the microorganism according to any aspect of the present invention may be *Clostridium kluyveri*.

The extraction step in (b) according to any aspect of the present invention allows for an increase in yield relative to the amount of extractants used. For example, less than 50% by weight of extractant may be used to extract the same amount of hexanoic acid as if only pure alkanes were used. Therefore, with a small volume of extractant, a larger yield of hexanoic acid may be extracted. The extractant is also not harmful to microorganisms. Accordingly, the extractant according to any aspect of the present invention may be present when the hexanoic acid is biotechnologically produced according to any aspect of the present invention. Therefore, the aqueous medium according to any aspect of the present invention, particularly after step (b) of separating the hexanoic acid, may be recycled back into step (a). This step of recycling allows for the microorganisms to be recycled and reused as the extractant according to any aspect of the present invention is not toxic to the microorganisms. This step of recycling the aqueous medium in the method according to any aspect of the present invention has the further advantage of enabling the residue of the hexanoic acid, which was not at first instance extracted from step (b) in the first cycle, to be given a chance to be extracted a further time or as many times as the aqueous medium is recycled. Further, the hexanoic acid can be easily separated from the extractant according to any aspect of the present invention by distillation. This is because hexanoic acid at least distills at a significantly lower boiling point than the extractant and after the separation via distillation, the extractant may be easily recycled.

The method according to any aspect of the present invention may include a step of extracting isolated hexanoic acid from an aqueous medium. An isolated hexanoic acid may refer to hexanoic acid that may be separated from the medium where the hexanoic acid has been produced. In one example, the hexanoic acid may be produced in an aqueous medium (e.g. fermentation medium where the hexanoic acid is produced by specific cells from a carbon source). The isolated hexanoic acid may refer to the hexanoic acid extracted from the aqueous medium. In particular, the extracting step allows for the separation of excess water from the aqueous medium thus resulting in a formation of a mixture containing the extracted hexanoic acid.

The extractant may also be referred to as the 'extraction medium' or 'extracting medium'. The extractant may be used for extracting/isolating the hexanoic acid produced according to any method of the present invention from the aqueous medium wherein the hexanoic acid was originally produced. At the end of the extracted step, excess water from the aqueous medium may be removed thus resulting in the extractant containing the extracted hexanoic acid. In particular, at the end of the extracted step, with the hexanoic acid extracted and removed, what remains may be the fermentation medium with the cells used for producing the hexanoic acid and these cells together with the fermentation medium may then be recycled for step (a). A skilled person would be able to determine if there needs to be a replenishment of the fermentation medium and/or cells after the first cycle. In particular, a first cycle according to any aspect of the present invention involves one round of steps (a) to (c). The medium and/or cells may then be recycled from the second cycle onwards. The extractant may comprise a combination of compounds that may result in an efficient means of extracting the hexanoic acid from the aqueous medium. In particular, the extractant may comprise:

at least one alkyl-phosphine oxide and at least one alkane comprising at least 12 carbon atoms; or at least one trialkylamine and at least one alkane comprising at least 12 carbon atoms.

The extractant according to any aspect of the present invention may efficiently extract the hexanoic acid into the extractant. This extractant of a mixture of alkyl-phosphine oxide or trialkylamine and at least one alkane may be considered suitable in the method according to any aspect of the present invention as the mixture works efficiently in extracting the desired hexanoic acid in the presence of a fermentation medium. In particular, the mixture of alkyl-phosphine oxide or trialkylamine and at least one alkane may be considered to work better than any method currently known in the art for extraction of hexanoic acid as it does not require any special equipment to be carried out and it is relatively easy to perform with a high product yield. Further, the extractant according to any aspect of the present invention is also not toxic the microorganism according to step (a).

The alkane in the extractant may comprise at least 12 carbon atoms. In particular, the alkane may comprise at 12-18 carbon atoms. In one example, the alkane may be selected from the group consisting of dodecane, tridecane, tetradecane, pentadecane, hexadecane, heptadecane and octadecane. In a further example, the extractant may comprise a mixture of alkanes.

Alkyl-phosphine oxides have a general formula of $OPX_3$, where X is an alkyl. Suitable alkyl phosphine oxides according to any aspect of the present invention include an alkyl group composed of a linear, branched or cyclic hydrocarbon, the hydrocarbon composed of from 1 to about 100 carbon atoms and from 1 to about 200 hydrogen atoms. In particular, "alkyl" as used in reference to alkyl phosphine oxide according to any aspect of the present invention can refer to a hydrocarbon group having 1 to 20 carbon atoms, frequently between 4 and 15 carbon atoms, or between 6 and 12 carbon atoms, and which can be composed of straight chains, cyclics, branched chains, or mixtures of these. The alkyl phosphine oxide may have from one to three alkyl groups on each phosphorus atom. In one example, the alkyl phosphine oxide has three alkyl groups on P. In some examples, the alkyl group may comprise an oxygen atom in place of one carbon of a C4-C15 or a C6-C12 alkyl group, provided the oxygen atom is not attached to P of the alkyl phosphine oxide. Typically, the alkyl phosphine oxide is selected from the group consisting of trioctylphosphine oxide, tri-butylphosphine oxide, hexyl-phosphine oxide, octylphosphine oxide and mixtures thereof. Even more in particular, the alkyl phosphine oxide may be trioctylphosphine oxide (TOPO).

Trialkylamines are organic-chemical compounds derived from ammonia ($NH_3$), whose three hydrogen atoms are replaced by alkyl radicals. Examples of trialkylamines are dimethylethylamine, methyldiethylamine, triethylamine, dimethyl-n-propylamine, dimethyl-i-propylamine, methyldi-n-propylamine, dimethylbutylamine, trioctylamine and the like. In particular, the trialkylamine used in the extractant according to any aspect of the present invention may not be soluble in water and may be trioctylamine.

In one example, the extractant according to any aspect of the present invention may be a combination of alkyl-phosphine oxide or trialkylamine and at least one alkane. In particular, the alkane may comprise at least 12 carbon atoms. More in particular, the alkane may comprise at 12-18 carbon atoms. In one example, the alkane may be selected from the group consisting of dodecane, tridecane, tetradecane, pentadecane, hexadecane, heptadecane and octadecane. In a further example, the extractant may comprise a mixture of alkanes. Even more in particular, the extractant according to any aspect of the present invention may be a combination of TOPO and tetradecane or hexadecane.

Trioctylphosphine oxide (TOPO) is an organophosphorus compound with the formula $OP(C_8H_{17})_3$. TOPO may be part of the extractant together with at least one alkane according to any aspect of the present invention. In particular, the mixture of TOPO and alkane comprising at least 12 carbon atoms may comprise about 1:100 to 1:10 weight ratio of TOPO relative to the alkane. More in particular, the weight ratio of TOPO to alkane in the extractant according to any aspect of the present invention may be about 1:100, 1:90, 1:80, 1:70, 1:60, 1:50, 1:40, 1:30, 1:25, 1:20, 1:15, or 1:10. Even more in particular, the weight ratio of TOPO to alkane may be selected within the range of 1:90 to 1:10, 1:80 to 1:10, 1:70 to 1:10, 1:60 to 1:10, 1:50 to 1:10, 1:40 to 1:10, 1:30 to 1:10 or 1:20 to 1:10. The weight ratio of TOPO to alkane may be between 1:40 to 1:15 or 1:25 to 1:15. In one example, the weight ratio of TOPO to alkane may be about 1:15. In the example, the alkane may be hexadecane and therefore the weight ratio of TOPO to hexadecane may be about 1:15.

In another example, when the extractant comprises an alkyl-phosphine oxide or a trialkylamine that is more soluble in the alkane used in the extractant compared to the solubility of TOPO in alkane comprising at least 12 carbon atoms, the weight ratio of the alkyl-phosphine oxide (other than TOPO) or a trialkylamine to alkane may be 1:1, 2:1, 3:1, 4:1, 5:1, 6:1, 7:1, 8:1, 9:1 or 10:1. In one example, the extractant may be trihexy-phosphine oxide and the ratio of trihexy-phosphine oxide to alkane may be 1:1. In other examples, the extractant may be a lower chain alkyl-phosphine oxide and the ratio of the lower chain alkyl-phosphine oxide to alkane may be 2:1, 3:1, 4:1, 5:1, 6:1, 7:1, 8:1, 9:1 or 10:1. In this case, a lower-chain alkyl-phosphine oxide refers to a phosphine oxide with a C1-C4 alkyl group. In another example, the extractant may be a trialkylamine, this is known to be more soluble than phosphine oxide in alkanes. For example, the trialkylamine may be a trioctylamine (TOA) that may be present in the extractant according to any aspect of the present invention in the ratio of up to 1:1 with the alkane. Lower chain length amines can be used in even higher ratios. In other examples, the extractant may be a lower chain trialkylamine and the ratio of the lower chain trialkylamine to alkane may be 2:1, 3:1, 4:1, 5:1, 6:1, 7:1, 8:1, 9:1 or 10:1. In this case, a lower-chain alkyl-phosphine oxide refers to a phosphine oxide with a C1-C4 alkyl group.

The term 'about' as used herein refers to a variation within 20 percent. In particular, the term "about" as used herein refers to +/−20%, more in particular, +/−10%, even more in particular, +/−5% of a given measurement or value.

In step (a) according to any aspect of the present invention, ethanol and/or acetate is contacted with at least one microorganism capable of carrying out carbon chain elongation to produce the hexanoic acid and/or an ester thereof from the ethanol and/or acetate. In one example, the carbon source may be ethanol in combination with at least one other carbon source selected from the group consisting of acetate and butyrate. In particular, the carbon source may be ethanol and acetate. In another example, the carbon source may be a combination of ethanol and butyric acid. In one example, the carbon substrate may be ethanol alone. In another example, the carbon substrate may be acetate alone.

The source of acetate and/or ethanol may vary depending on availability. In one example, the ethanol and/or acetate may be the product of fermentation of synthesis gas or any carbohydrate known in the art. In particular, the carbon source for acetate and/or ethanol production may be selected from the group consisting of alcohols, aldehydes, glucose, sucrose, fructose, dextrose, lactose, xylose, pentose, polyol, hexose, ethanol and synthesis gas.

Mixtures of sources can be used as a carbon source.

Even more in particular, the carbon source may be synthesis gas. The synthesis gas may be converted to ethanol and/or acetate in the presence of at least one acetogenic bacteria.

With respect to the source of substrates comprising carbon dioxide and/or carbon monoxide, a skilled person would understand that many possible sources for the provision of CO and/or $CO_2$ as a carbon source exist. It can be seen that in practice, as the carbon source of the present invention any gas or any gas mixture can be used which is able to supply the microorganisms with sufficient amounts of carbon, so that acetate and/or ethanol, may be formed from the source of CO and/or $CO_2$.

Generally for the acetogenic cell of the present invention the carbon source comprises at least 50% by weight, at least 70% by weight, particularly at least 90% by weight of $CO_2$ and/or CO, wherein the percentages by weight—% relate to all carbon sources that are available to the cell according to any aspect of the present invention. The carbon material source may be provided.

Examples of carbon sources in gas forms include exhaust gases such as synthesis gas, flue gas and petroleum refinery gases produced by yeast fermentation or clostridial fermentation. These exhaust gases are formed from the gasification of cellulose-containing materials or coal gasification. In one example, these exhaust gases may not necessarily be produced as by-products of other processes but can specifically be produced for use with the mixed culture of the present invention.

According to any aspect of the present invention, the carbon source for the production of acetate and/or ethanol used in step (a) according to any aspect of the present invention may be synthesis gas. Synthesis gas can for example be produced as a by-product of coal gasification. Accordingly, the microorganism according to any aspect of the present invention may be capable of converting a substance which is a waste product into a valuable resource.

In another example, synthesis gas may be a by-product of gasification of widely available, low-cost agricultural raw materials for use with the mixed culture of the present invention to produce substituted and unsubstituted organic compounds.

There are numerous examples of raw materials that can be converted into synthesis gas, as almost all forms of vegetation can be used for this purpose. In particular, raw materials are selected from the group consisting of perennial grasses such as miscanthus, corn residues, processing waste such as sawdust and the like.

In general, synthesis gas may be obtained in a gasification apparatus of dried biomass, mainly through pyrolysis, partial oxidation and steam reforming, wherein the primary products of the synthesis gas are CO, $H_2$ and $CO_2$. Syngas may also be a product of electrolysis of $CO_2$. A skilled person would understand the suitable conditions to carry out electrolysis of $CO_2$ to produce syngas comprising CO in a desired amount.

Usually, a portion of the synthesis gas obtained from the gasification process is first processed in order to optimize product yields, and to avoid formation of tar. Cracking of the undesired tar and CO in the synthesis gas may be carried out using lime and/or dolomite.

The overall efficiency, ethanol and/or acetate productivity and/or overall carbon capture of the method of the present invention may be dependent on the stoichiometry of the $CO_2$, CO, and $H_2$ in the continuous gas flow. The continuous gas flows applied may be of composition $CO_2$ and $H_2$. In particular, in the continuous gas flow, concentration range of CO$_2$ may be about 10-50%, in particular 3% by weight and H2 would be within 44% to 84%, in particular, 64 to 66.04% by weight. In another example, the continuous gas flow can also comprise inert gases like N$_2$, up to a N$_2$ concentration of 50% by weight.

More in particular, the carbon source comprising CO and/or CO$_2$ contacts the acetogenic cells in a continuous gas flow. Even more in particular, the continuous gas flow comprises synthesis gas. These gases may be supplied for example using nozzles that open up into the aqueous medium, frits, membranes within the pipe supplying the gas into the aqueous medium and the like.

A skilled person would understand that it may be necessary to monitor the composition and flow rates of the streams at relevant intervals. Control of the composition of the stream can be achieved by varying the proportions of the constituent streams to achieve a target or desirable composition. The composition and flow rate of the blended stream can be monitored by any means known in the art. In one example, the system is adapted to continuously monitor the flow rates and compositions of at least two streams and combine them to produce a single blended substrate stream in a continuous gas flow of optimal composition, and means for passing the optimised substrate stream to the fermenter.

According to any aspect of the present invention, a reducing agent, for example hydrogen may be supplied together with the carbon source. In particular, this hydrogen may be supplied when the CO and/or CO$_2$ is supplied and/or used. In one example, the hydrogen gas is part of the synthesis gas present according to any aspect of the present invention. In another example, where the hydrogen gas in the synthesis gas is insufficient for the method of the present invention, additional hydrogen gas may be supplied.

The term "acetogenic bacteria" as used herein refers to a microorganism which is able to perform the Wood-Ljungdahl pathway and thus is able to convert CO, CO$_2$ and/or hydrogen to acetate. These microorganisms include microorganisms which in their wild-type form do not have a Wood-Ljungdahl pathway, but have acquired this trait as a result of genetic modification. Such microorganisms include but are not limited to *E. coli* cells. These microorganisms may be also known as carboxydotrophic bacteria. Currently, 21 different genera of the acetogenic bacteria are known in the art (Drake et al., 2006), and these may also include some clostridia (Drake & Kusel, 2005). These bacteria are able to use carbon dioxide or carbon monoxide as a carbon source with hydrogen as an energy source (Wood, 1991). Further, alcohols, aidehydes, carboxylic acids as well as numerous hexoses may also be used as a carbon source (Drake et al., 2004). The reductive pathway that leads to the formation of acetate is referred to as acetyl-CoA or Wood-Ljungdahl pathway. In particular, the acetogenic bacteria may be selected from the group consisting of *Acetoanaerobium notera* (ATCC 35199), *Acetonema longum* (DSM 6540), *Acetobacterium carbinolicum* (DSM 2925), *Acetobacterium malicum* (DSM 4132), *Acetobacterium* species no. 446 (Morinaga et al., 1990, *J. Biotechnol., Vol.* 14, p. 187-194), *Acetobacterium wieringae* (DSM 1911), *Acetobacterium woodii* (DSM 1030), *Alkalibaculum bacchi* (DSM 22112), *Archaeoglobus fulgidus* (DSM 4304), *Blautia producta* (DSM 2950, formerly *Ruminococcus productus*, formerly *Peptostreptococcus productus*), *Butyribactenum methylotrophicum* (DSM 3468), *Clostridium aceticum* (DSM 1496), *Clostridium autoethanogenum* (DSM 10061, DSM 19630 and DSM 23693), *Clostridium carboxidivorans* (DSM 15243), *Clostridium coskatii* (ATCC no. PTA-10522), *Clostridium drakei* (ATCC BA-623), *Clostridium formicoaceticum* (DSM 92), *Clostridium glycolicum* (DSM 1288), *Clostridium ljungdahlii* (DSM 13528), *Clostridium ljungdahlii* C-01 (ATCC 55988), *Clostridium ljungdahlii* ERI-2 (ATCC 55380), *Clostridium ljungdahlii* 0-52 (ATCC 55989), *Clostridium mayombei* (DSM 6539), *Clostridium methoxybenzovorans* (DSM 12182), *Clostridium ragsdalei* (DSM 15248), *Clostridium scatologenes* (DSM 757), *Clostridium* species ATCC 29797 (Schmidt et al., 1986, *Chem. Eng. Commun.*, Vol. 45, p. 61-73), *Desulfotomaculum kuznetsovii* (DSM 6115), *Desulfotomaculum thermobezoicum* subsp. *thermosyntrophicum* (DSM 14055), *Eubacterium limosum* (DSM 20543), *Methanosarcina acetivorans* C2A (DSM 2834), *Moorella* sp. HUC22-1 (Sakai et al., 2004, *Biotechnol. Let.*, Vol. 29, p. 1607-1612), *Moorella thermoacetica* (DSM 521, formerly *Clostridium thermoacetcum*), *Moorella thermoautotrophica* (DSM 1974), *Oxobacter pfennigii* (DSM 322), *Sporomusa aerivorans* (DSM 13326), *Sporomusa ovata* (DSM 2662), *Sporomusa silvacetica* (DSM 10669), *Sporomusa sphaeroides* (DSM 2875), *Sporomusa termitida* (DSM 4440) and *Thermoanaerobacter kivui* (DSM 2030, formerly *Acetogenium kivui*).

More in particular, the strain ATCC BAA-624 of *Clostridium carboxidivorans* may be used. Even more in particular, the bacterial strain labelled "P7" and "P11" of *Clostridium carboxidivorans* as described for example in U.S. 2007/0275447 and U.S. 2008/0057554 may be used.

Another particularly suitable bacterium may be *Clostridiuml jungdahlii*. In particular, strains selected from the group consisting of *Clostridium ljungdahlii* PETC, *Clostridium ljungdahlii* ERI2, *Clostridium ljungdahlii* COL and *Clostridium ljungdahlii* O-52 may be used in the conversion of synthesis gas to hexanoic acid. These strains for example are described in WO 98/00558, WO 00/68407, ATCC 49587, ATCC 55988 and ATCC 55989.

In one example, the production of the hexanoic acid is from acetate and/or ethanol which is from synthesis gas and may involve the use of the acetogenic bacteria in conjunction with a microorganism capable of carbon chain elongation. For example, *Clostridium ljungdahlii* may be used simultaneously with *Clostridium kluyver*. In another example, a single acetogenic cell may be capable of the activity of both organisms. For example, the acetogenic bacteria may be *C. carboxidivorans* which may be capable of carrying out both the Wood-Ljungdahl pathway and the carbon chain elongation pathway.

The ethanol and/or acetate used in step (a) according to any aspect of the present invention may be a product of fermentation of synthesis gas or may be obtained through other means. The ethanol and/or acetate may then be brought into contact with the microorganism in step (a).

The term "contacting", as used herein, means bringing about direct contact between the microorganism and the ethanol and/or acetate. In one example, ethanol is the carbon source and the contacting in step (a) involves contacting the ethanol with the microorganism of step (a). The contact may be a direct contact or an indirect one that may include a membrane or the like separating the cells from the ethanol or where the cells and the ethanol may be kept in two different compartments etc. For example, in step (b) the hexanoic acid, and the extracting medium may be in different compartments.

The microorganisms capable of producing the hexanoic acid according to any aspect of the present invention may be cultivated with any culture media, substrates, conditions, and processes generally known in the art for culturing bacteria. This allows for the hexanoic acid to be produced using a biotechnological method. Depending on the microorganism that is used for hexanoic acid production, appropriate growth medium, pH, temperature, agitation rate, inoculum level, and/or aerobic, microaerobic, or anaerobic conditions are varied. A skilled person would understand the other conditions necessary to carry out the method according to any aspect of the present invention. In particular, the conditions in the container (e.g. fermenter) may be varied depending on the microorganisms used. The varying of the conditions to be suitable for the optimal functioning of the microorganisms is within the knowledge of a skilled person.

In one example, the method, in particular step (a) according to any aspect of the present invention may be carried out in an aqueous medium with a pH between 5 and 8, 5.5 and 8 or 5.5 and 7. The pressure may be between 1 and 10 bar. The microorganisms may be cultured at a temperature ranging from about 20° C. to about 80° C. In one example, the microorganism may be cultured at 37° C.

In some examples, for the growth of the microorganism and for its production of hexanoic acid, the aqueous medium may comprise any nutrients, ingredients, and/or supplements suitable for growing the microorganism or for promoting the production of the hexanoic acid. In particular, the aqueous medium may comprise at least one of the following: carbon sources, nitrogen sources, such as an ammonium salt, yeast extract, or peptone; minerals; salts; cofactors; buffering agents; vitamins; and any other components and/or extracts that may promote the growth of the bacteria. The culture medium to be used must be suitable for the requirements of the particular strains. Descriptions of culture media for various microorganisms are given in "Manual of Methods for General Bacteriology".

The term "an aqueous solution" or "medium" comprises any solution comprising water, mainly water as solvent that may be used to keep the cell according to any aspect of the present invention, at least temporarily, in a metabolically active and/or viable state and comprises, if such is necessary, any additional substrates. The person skilled in the art is familiar with the preparation of numerous aqueous solutions, usually referred to as media that may be used to keep and/or culture the cells, for example LB medium in the case of *E. coli*, ATCC1754-Medium may be used in the case of *C. ljungdahlii*. It is advantageous to use as an aqueous solution a minimal medium, i.e. a medium of reasonably simple composition that comprises only the minimal set of salts and nutrients indispensable for keeping the cell in a metabolically active and/or viable state, by contrast to complex mediums, to avoid dispensable contamination of the products with unwanted side products. For example, M9 medium may be used as a minimal medium. The cells are incubated with the carbon source sufficiently long enough to produce the desired product. For example for at least 1, 2, 4, 5, 10 or 20 hours. The temperature chosen must be such that the cells according to any aspect of the present invention remains catalytically competent and/or metabolically active, for example 10 to 42° C., preferably 30 to 40° C., in particular, 32 to 38° C. in case the cell is a *C. ljungdahlii* cell. The aqueous medium according to any aspect of the present invention also includes the medium in which the hexanoic acid is produced. It mainly refers to a medium where the solution comprises substantially water. In one example, the aqueous medium in which the cells are used to produce the hexanoic acid is the very medium which contacts the extractant for extraction of the hexanoic acid.

According to any aspect of the present invention it is preferred that the extraction is carried out in step (b) while fermentation takes place in step (a) simultaneously. This depicts an in situ extracting the hexanoic acid and/or ester thereof in step (b).

In step (b) according to any aspect of the present invention, the hexanoic acid in the aqueous medium may contact the extractant for a time sufficient to extract the hexanoic acid from the aqueous medium into the extractant. A skilled person may be capable of determining the amount of time needed to reach distribution equilibrium and the right bubble agglomeration that may be needed to optimize the extraction process. In some examples the time needed may be dependent on the amount of hexanoic acid that may be extracted. In particular, the time needed to extract the hexanoic acid from the aqueous medium into the extractant may only take a few minutes. According to any aspect of the present invention, where the extraction is carried out in step (b) as fermentation takes place in step (a), the time for extraction may be equivalent to the time of fermentation.

The ratio of the extractant used to the amount of hexanoic acid to be extracted may vary depending on how quick the extraction is to be carried out. In one example, the amount of extractant is equal to the amount of aqueous medium comprising the hexanoic acid. After the step of contacting the extractant with the aqueous medium, the two phases (aqueous and organic) are separated using any means known in the art. In one example, the two phases may be separated using a separation funnel. The two phases may also be separated using mixer-settlers, pulsed columns, and the like. In one example, the separation of the extracting medium from the hexanoic acid may be carried out using distillation in view of the fact that hexanoic acid distills at a significantly lower boiling point than the extractant. A skilled person may be able to select the best method of separating the extractant from the desired hexanoic acid in step (b) depending on the characteristics of the hexanoic acid. In particular, step (c) according to any aspect of the present invention involves the recovering of the hexanoic acid from step (b). The hexanoic acid brought into contact with the organic extractant results in the formation of two phases, the two phases (aqueous and organic) are separated using any means known in the art. In one example, the two phases may be separated using a separation funnel. The two phases may also be separated using mixer-settlers, pulsed columns, thermal separation and the like. In one example, where the alkanoic acid is hexanoic acid, the separation of the extracting medium from the hexanoic acid may be carried out using distillation in view of the fact that hexanoic acid distills at a significantly lower boiling point than the extracting medium.

Step (b) ends with the organic absorbent made available again to be recycled or reused.

Accordingly, the method of extraction of hexanoic acid according to any aspect of the present invention may be used together with any biotechnological method of producing the hexanoic acid. This is especially advantageous as usually during the fermentation process to produce hexanoic acid using biological methods, the hexanoic acid would be left to collect in the aqueous medium and after reaching certain concentrations in the fermentation medium, the very target product (hexanoic acid) may inhibit the activity and productivity of the microorganism. This thus limits the overall yield of the fermentation process. With the use of this extraction method, the hexanoic acid is extracted as it is produced thus reducing end-product inhibition drastically.

The method according to any aspect of the present invention is also more efficient and cost-effective than the traditional methods of removing hexanoic acid, particularly from a fermentation method as it is produced, as there is no primary reliance on distillation and/or a precipitation for recovering of hexanoic acids. Distillation or precipitation process may lead to higher manufacturing costs, lower yield, and higher waste products therefore reducing the overall efficiency of the process. The method according to any aspect of the present invention attempts to overcome these shortcomings.

In particular, the mixture of the microorganism and the carbon source according to any aspect of the present invention may be employed in any known bioreactor or fermenter to carry out any aspect of the present invention. In one example, the complete method according to any aspect of the present invention that begins with the biotechnological production of the hexanoic acid from acetate and/or ethanol and ends with the extraction of the hexanoic acid takes place in a single container. There may therefore be no separation step between the step of producing hexanoic acid and the step of extracting the hexanoic acid. This saves time and costs. In particular, during the fermentation process, the microorganism may be grown in the aqueous medium and in the presence of the extractant. The method according to any aspect of the present invention thus provides for a one pot means of producing hexanoic acid. Also, since the hexanoic acid is being extracted as it is produced, no end-product inhibition takes place, ensuring that the yield of hexanoic acid is maintained. A further step of separation may be carried out to remove the hexanoic acid. Any separation method known in the art such as using a funnel, column, distillation and the like may be used. The remaining extractant and/or the cells may then be recycled.

In another example, the hexanoic acid extraction process may take place as a separate step and/or in another pot. After fermentation has taken place, where the desired hexanoic acid to be extracted has already been produced, the extractant according to any aspect of the present invention may be added to the fermentation medium or the fermentation medium may be added to a pot comprising the extractant. The desired hexanoic acid may then be extracted by any separation method known in the art such as using a funnel, column, distillation and the like. The remaining extractant may then be recycled. The fermentation medium with the cells may also be recycled.

Another advantage of the method is that the extractant may be recycled. Therefore, once the hexanoic acid is separated from extractant, the extractant can be recycled and reused, reducing waste.

Step (c) of the method according to any aspect of the present invention involves (c) contacting the extracted hexanoic acid and/or ester thereof from (b) with at least one ketonization catalyst and eventually a further alkanoic acid comprising 1 to 22 carbon atoms under suitable reaction conditions for chemical ketonization of hexanoic acid to higher alkanones, preferably 6-undecanone.

The term "further alkanoic acid comprising 1 to 22 carbon atoms" does not encompass hexanoic acid. Preferably the further alkanoic acid comprising 1 to 22 carbon atoms is selected from straight chain alkanoic acids comprising 4 to 18, preferably 5 to 12, carbon atoms.

A ketonization catalyst according to any aspect of the present invention may be any metal oxide catalyst or mixtures thereof. Ketonization reacts hexanoic acid with the further alkanoic acid and/or the hexanoic acid, preferably dimerizes two hexanoic acid molecules, to one ketone molecule with the removal of one water and one carbon dioxide. The mechanism that may be involved in ketonization of hexanoic acid where hexanoic anhydride (($CH_3(CH_2)_4)COOCO(CH_2)_4CH_3$) may be formed is disclosed at least in Woo, Y., *Ind. Eng. Chem. Res.* 2017, 56: 872-880. Ketonization of hexanoic acid in the presence of a variety of metal oxide catalysts is at also shown in Wang, S. *J. Phys. Chem. C* 2017, 121, 18030-18046.

The ketonization catalyst used according to any aspect of this present invention may be a heterogeneous catalyst for the efficient production of a higher-energy-density ketone, preferably C11, from biologically produced hexanoic acid according to step (a). In particular, a ketonization catalyst may be any metal oxide catalyst or mixtures thereof selected from the group consisting of metal oxide catalyst or mixtures thereof is selected from the group consisting of heteropoly acid ($H_3PW_{12}O_{40}$) catalyst, niobium oxide ($Nb_2O_5$) catalyst, titanium oxide ($TiO_2$) catalyst, cerium oxide ($CeO_2$) catalyst, zinc-chromium (Zn—Cr) mixed oxide catalyst, manganese oxide ($MnO_x$) catalyst, lanthanum oxide ($La_2O_3$) catalyst, magnesium oxide (MgO) catalyst, iron oxide ($FeO$, $FeO_2$, $Fe_2O_3$, $Fe_3O_4$, $Fe_4O_5$, $Fe_5O_6$, $Fe_5O_7$), silicon-aluminium ($Si_yAl_zO$) mixed oxide catalyst, aluminium oxide ($Al_2O_3$) catalyst and zirconia ($ZrO_2$) catalyst. The 'x' in $MnO_x$ may be 1, 2 or 4. The 'y' and 'z' in $Si_yAl_zO$ may refer to any number where the ratio z/y is any number between 0 to 1. In one example, ketonization is carried out on hexanoic acid as disclosed in Pham T. N., *ACS Catal.* 2013, 3: 2456-2473 using a suitable heterogenous hydrogenation metal catalyst and suitable reaction conditions. The conditions as disclosed can vary depending on the catalyst used for effective yield of higher alkanones, preferably 6-undecanone. In yet another example, $MnO_2$ and/or $Al_2O_3$ catalyst may be used based on what is disclosed in Gliński, M. et al, *Polish J. Chem.* 2004, 78: 299-302 for ketonizing hexanoic acid to 6-undecanone. In a further example, $Nb_2O_5$ catalyst may be used as disclosed in U.S. Pat. No. 6,265,618 B1 especially in example 3 in ketonizing hexanoic acid to 6-undecanone. A skilled person would by simple trial and error be able to identify the suitable catalyst and the appropriate conditions for producing higher alkanones, preferably 6-undecanone, from hexanoic acid and eventually another alkanoic acid based on the state of the art. Orozco, L. M et al *Chem Sus Chem*, 2016, 9(17): 2430-2442 and Orozco, L. M et al *Green Chemistry*, 2017, 19(6): 1555-1569 also disclose other catalyst that may be used as ketonization catalysts according to any aspect of the present invention.

It would be within the knowledge of a skilled person to determine the suitable conditions for the use of the different ketonization catalysts in step (c). In particular, the ketonization catalyst may be a zirconia aerogel catalyst and may be used in the ketonization of hexanoic acid as disclosed in Woo, Y., *Ind. Eng. Chem. Res.* 2017, 56: 872-880. The zirconia aerogel catalyst may not only efficiently produce higher alkanones, preferably 6-undecanone, but it also avoids leaching of the catalysts. Lee, Y. et al in *Applied Catalysis A: General.* 2015, 506: 288-293 discloses different ketonization catalysts and their effectiveness in ketonization hexanoic acid. A skilled person can very easily use the method described in Lee Y., et al to determine the suitable ketonization catalysts and/or conditions for use in the ketonization of hexanoic acid. In particular, suitable reaction conditions of step (c) comprises reaction temperatures of 100° C.-500° C., 100° C.-450° C., 100° C.-400° C., 100° C.-350° C., 100° C.-300° C., 100° C.-250° C., 100° C.-200° C., 150° C.-500° C., 150° C.-450° C., 150° C.-400° C., 150° C.-350° C., 150° C.-300° C., 150° C.-250° C., 150° C.-200° C., 200° C.-500° C., 200° C.-450° C., 200° C.-400° C., 200° C.-350° C., 200° C.-300° C., 200° C.-250° C., 250° C.-500° C., 250° C.-450° C., 250° C.-400° C., 250° C.-350° C., 250°

C.-300° C. and the like. More in particular, higher alkanones, preferably 6-undecanone, may be produced from hexanoic acid using zirconia aerogel catalyst as the ketonization catalyst at reaction temperatures of 150° C.-250° C.

According to another aspect of the present invention, there is provided a method of producing higher alkanols, preferably 6-undecanol, from ethanol and/or acetate, the method comprising: (d) contacting the higher alkanone, preferably the 6-undecanone, produced according to any aspect of the present invention with at least one hydrogenation metal catalyst for catalytic hydrogenation of the higher alkanone, preferably 6-undecanone, to higher alkanols, preferably 6-undecanol. Higher alkanols, preferably 6-undecanol ($C_{11}H_{24}O$), a secondary alcohol, are a result of the catalytic hydrogenation of the higher alkanone, preferably 6-undecanone, a molecule of hydrogen is added across the carbon-oxygen double bond to ultimately furnish the higher alkanol, preferably 6-undecanol, as the final product.

In particular this aspect of the present invention comprises (a) contacting the ethanol and/or acetate with at least one microorganism capable of carrying out carbon chain elongation to produce hexanoic acid and/or an ester thereof from the ethanol and/or acetate; (b) extracting the hexanoic acid and/or ester thereof from (a) using at least one extractant in an aqueous medium, wherein the extractant comprises at least one alkyl-phosphine oxide and at least one alkane comprising at least 12 carbon atoms; or at least one trialkylamine and at least one alkane comprising at least 12 carbon atoms; (c) contacting the extracted hexanoic acid and/or ester thereof from (b) with at least one ketonization catalyst and eventually a further alkanoic acid comprising 1 to 22 carbon atoms under suitable reaction conditions for chemical ketonization of hexanoic acid and eventually the further alkanoic acid to a higher alkanone, preferably 6-undecanone, and (d) contacting the higher alkanone, preferably the 6-undecanone, with at least one hydrogenation metal catalyst for catalytic hydrogenation of the higher alkanone, preferably 6-undecanone, to higher alkanols, preferably 6-undecanol.

The hydrogenation metal catalyst may be a homogeneous or heterogeneous catalyst.

Homogeneous metal catalysts may be metal complexes that are known in the art. In particular, the hydrogenation metal catalyst may be a heterogeneous catalyst. Some advantages of using multiphase catalytic reactions using solid catalysts include easy separation of catalysts and products, easy recovery, and catalyst recycling, and relatively mild operating conditions. There are also clear economic and environmental incentives in using heterogeneous catalysts. In particular, the hydrogenation metal catalyst may be selected from the group consisting of ruthenium (Ru) catalyst, rhenium (Re) catalyst, nickel (Ni) catalyst, iron (Fe), cobalt (Co), palladium (Pd) catalyst and platinum (Pt) catalyst. More in particular, the catalyst may be selected from the group consisting of Ni, Pd and Pt catalyst. In one example, the hydrogenation metal catalyst used according to any aspect of the present invention may be nickel nanoparticles as described in Alonso, F. *Tetrahedron,* 2008, 64: 1847-52. In another example, Iron(II) PNP Pincer Complexes may be used as the hydrogenation metal catalyst for hydrogenation of the higher alkanone to the higher alcohol, preferably from 6-undecanone to 6-undecanol, as disclosed in Gorgas, N., *Organometallics,* 2014, 33 (23): 6905-6914. In yet another example, magnetite nanoparticles of ruthenium (Ru) catalyst, rhenium (Re) catalyst, nickel (Ni) catalyst, iron (Fe), cobalt (Co), palladium (Pd) catalyst or platinum (Pt) catalyst as described in Tariq Shah M., et al., ACS Applied Materials & Interfaces, 2015: 7(12), 6480-9 may be used as the heterogenous hydrogenation metal catalyst according to any aspect of the present invention. In yet another example, a copper-phosphine complex is used as a homogeneous hydrogenation metal catalyst according to any aspect of the present invention as disclosed in Chen, J-X., *Tetrahedron,* 2000, 56: 2153-2166. In a further example, a heterogenous Pt catalyst, in particular a $Pt/Al_2O_3$ catalyst, as disclosed in Journalof *Molecular Catalysis A: Chemical,* 2014, 388-389: 116-122 may be used in hydrogenation of the higher alkanone to the higher alcohol, preferably from 6-undecanone to 6-undecanol. *Chem Sus Chem,* 2017: 10(11), 2527-2533 also discloses a variety of heterogenous catalysts such as Pt/C, Ru/C, and Pd/C that may be used in combination with or without an acid catalyst for the hydrogenation of 6-undecanone to 6-undecanol. Based on the above, a skilled person may determine a suitable hydrogenation catalyst to be used according to any aspect of the present invention to yield the higher alkanol from the higher alkanone, preferably 6-undecanol from 6-undecanone.

A skilled person would easily be able to determine the suitable hydrogenation metal catalyst and vary the conditions accordingly to efficiently produce higher alkanols, preferably 6-undecanol, from hydrogenation of 6-undecanone.

According to yet another aspect of the present invention, there is provided a method of producing alkanoic acids, preferably lauric acid, from ethanol and/or acetate, the method comprising (e) contacting the higher alkanol, preferably 6-undecanol, produced according to any aspect of the present invention with C02 and a homogeneous carboxylation catalyst capable of carboxylation of the higher alkanol, preferably 6-undecanol, to an alkanoic acid, preferably lauric acid.

In particular this aspect of the present invention comprises (a) contacting the ethanol and/or acetate with at least one microorganism capable of carrying out carbon chain elongation to produce hexanoic acid and/or an ester thereof from the ethanol and/or acetate; (b) extracting the hexanoic acid and/or ester thereof from (a) using at least one extractant in an aqueous medium, wherein the extractant comprises at least one alkyl-phosphine oxide and at least one alkane comprising at least 12 carbon atoms; or at least one trialkylamine and at least one alkane comprising at least 12 carbon atoms; (c) contacting the extracted hexanoic acid and/or ester thereof from (b) with at least one ketonization catalyst and eventually a further alkanoic acid comprising 1 to 22 carbon atoms under suitable reaction conditions for chemical ketonization of hexanoic acid and eventually the further alkanoic acid to a higher alkanone, preferably 6-undecanone, and (d) contacting the higher alkanone, preferably the 6-undecanone, with at least one hydrogenation metal catalyst for catalytic hydrogenation of the higher alkanone, preferably 6-undecanone, to higher alkanols, preferably 6-undecanol, and (e) contacting the higher alkanol, preferably 6-undecanol, produced according to any aspect of the present invention with $CO_2$ and a homogeneous carboxylation catalyst capable of carboxylation of the higher alkanol, preferably 6-undecanol, to an alkanoic acid, preferably lauric acid.

Alkanoic acids, preferably lauric acid ($C_{12}H_{24}O_2$), also known as dodecanoic acid, may be produced from the higher alkanol, preferably 6-undecanol, in the presence of a carboxylation catalyst. The possible method is at least disclosed in scheme 1.

Scheme 1 Formation of 6-undecanone, 6-undecanol and lauric acid from hexanoic acid

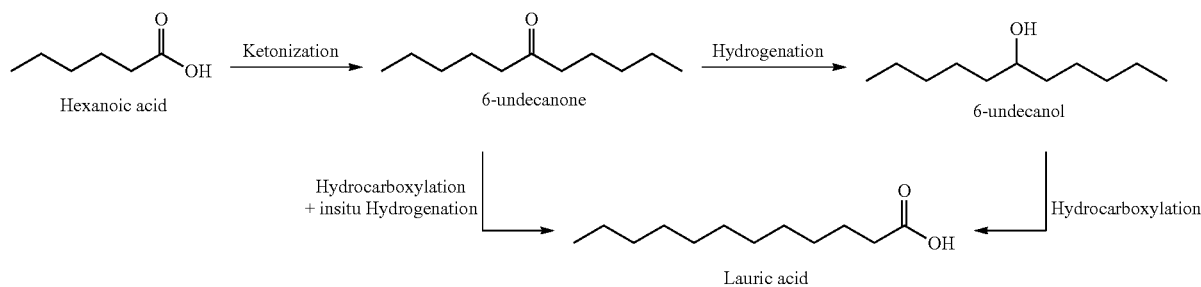

The carboxylation catalyst may be selected from the group consisting of Rh, Ni, Ru, Co, Pt, Pd and Fe catalysts. A skilled person would be able to determine the suitable conditions and ligands that may be necessary to be used in conjunction with the carboxylation catalyst for the effective and efficient conversion of the higher alkanol, preferably 6-undecanol, produced according to any aspect of the present invention, to an alkanoic acid, preferably lauric acid. In particular, the carboxylation catalyst according to any aspect of the present invention may be a homogeneous carboxylation catalyst. In one example, the step (e) according to any aspect of the present invention involves (ei) of contacting the higher alkanol, preferably 6-undecanol, produced according to any aspect of the present invention with at least one nickel catalyst and carbon dioxide at atmospheric pressure for carboxylation of the higher alkanol to higher alkanoic acid, preferably of 6-undecanol to lauric acid. The step (ei) may include a bromide intermediate that is formed. Details of the method of step (ei) is further disclosed in Juliá-Hernández, Nature, 2017, 545: 84-88.

In another example, the step (e) according to any aspect of the present invention involves (eii) of contacting the higher alkanol, preferably 6-undecanol, produced according to any aspect of the present invention with hydrogen, $CO_2$ and a homogeneous Rh catalyst for carboxylation of the higher alkanol to higher alkanoic acid, preferably of 6-undecanol to lauric acid. This method of catalytic hydrocarboxylation (Scheme 2) is further described in detail in Ostapowicz, T. G et al. Angew. Chem. Int, Ed., 2013, 52:12119-23.

Scheme 2 Catalytic hydrocarboxylation of olefins with $CO_2$.

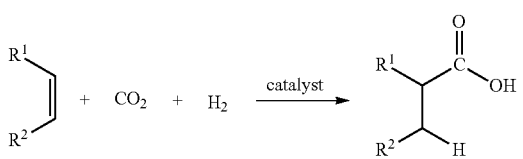

In particular, the step (eii) may be carried out in the presence of elevated temperatures. More in particular, the elevated temperature for step (eii) may be in the range of 100 to 300° C. For example, the temperature for step (eii) may be within the range of 100-250, 100-200, 150-300, or 150-250° C. Further, suitable conditions for step (eii) may include the partial pressure of CO2 to be in the range of 0.1 to 200 bar, in particular, the partial pressure of CO2 may be between 0.1-150, 0.1-100, 0.1-60 bar and the like. A skilled person would be capable of the determining the suitable conditions for carboxylation does not inhibit the catalyst and produces a good yield of higher alkanoic acid from higher alkanol, preferably of lauric acid from 6-undecanol.

Other examples of carboxylation catalysts that may be used in step (e) according to any aspect of the present invention may at least be described in *Journal of Molecular Catalysis A: Chemical,* 2003, 197: 61-64, *J. Am. Chem. Soc.* 1985, 107: 3568-3572, *J. Am. Chem. Soc.* 1985, 107: 3565-3567 and *Journal of Molecular Catalysts,* 1987, 40: 71-82.

In one example, the hydrogenation metal catalyst of step (c) may be also capable of carrying out the carboxylation of step (e) according to any aspect of the present invention. Therefore, a single catalyst may result in the formation of alkanoic acid directly from higher alkanone, preferably of lauric acid directly from 6-undecanone. In particular, the catalyst that may be used to convert the higher alkanone to the alkanoic acid, preferably 6-undecanone to lauric acid (i.e. steps (d) and (e) may be a homogeneous metal catalyst. More in particular, the homogeneous metal catalyst that may be used to carry out steps (d) and (e) may be a homogenous Rh catalyst. Possible examples of the homogenous Rh catalyst and suitable conditions for use are at least described in *Organic Letters,* 2008, 10(20): 4697-4700, *Organometallics,* 2008, 27(21): 5494-5503, *European Journal of Organic Chemistry,* 2002, 10: 1685-1689, *European Journal of Inorganic Chemistry,* 2001, 1: 289-296 and *Angewandte Chemie, International Edition,* 1998, 37(8): 1100-1103.

EXAMPLES

The foregoing describes preferred embodiments, which, as will be understood by those skilled in the art, may be subject to variations or modifications in design, construction or operation without departing from the scope of the claims. These variations, for instance, are intended to be covered by the scope of the claims.

Example 1

*Clostridium kluyven* Forming Hexanoic Acid from Acetate and Ethanol

For the biotransformation of ethanol and acetate to hexanoic acid the bacterium *Clostridium kluyveri* was used. All cultivation steps were carried out under anaerobic conditions in pressure-resistant glass bottles that can be closed airtight with a butyl rubber stopper.

For the preculture 100 ml of DMSZ52 medium (pH=7.0; 10 g/L K-acetate, 0.31 g/L $K_2HPO_4$, 0.23 g/L $KH_2PO_4$, 0.25 g/l $NH_4Cl$, 0.20 g/l $MgSO_4 \times 7\ H_2O$, 1 g/L yeast extract, 0.50 mg/L resazurin, 10 µl/HCl (25%, 7.7 M), 1.5 mg/L $FeCl_2 \times 4H_2O$, 70 µg/L $ZnCl_2 \times 7H_2O$, 100 µg/L $MnCl_2 \times 4H_2O$, 6

µg/L H$_3$BO$_3$, 190 µg/L CoCl$_2$×6H$_2$O, 2 µg/L CuCl$_2$×6H$_2$O, 24 µg/L NiCl$_2$×6H$_2$O, 36 µg/L Na$_2$MO$_4$×2H$_2$O, 0.5 mg/L NaOH, 3 µg/L Na$_2$SeO$_3$×5H$_2$O, 4 µg/L Na$_2$WO$_4$×2H$_2$O, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/L thiamine-HClx2H$_2$O, 20 ml/L ethanol, 2.5 g/L NaHCO$_3$, 0.25 g/L cysteine-HClxH$_2$O, 0.25 g/L Na$_2$Sx9H$_2$O) in a 250 ml bottle were inoculated with 5 ml of a frozen cryoculture of *Clostridium kluyveri* and incubated at 37° C. for 144 h to an OD$_{600nm}$>0.2.

For the main culture 200 ml of fresh DMSZ52 medium in a 500 ml bottle were inoculated with centrifuged cells from the preculture to an OD$_{600nm}$ of 0.1. This growing culture was incubated at 37° C. for 27 h to an OD$_{600nm}$>0.6. Then the cell suspension was centrifuged, washed with production buffer (pH 6.0; 0.832 g/L K-acetate, 5.0 g/l ethanol) and centrifuged again.

For the production culture, 200 ml of production buffer in a 500 ml bottle was inoculated with the washed cells from the main culture to an OD$_{600nm}$ of 0.2. The culture was capped with a butyl rubber stopper and incubated for 71 h at 37° C. and 100 rpm in an open water shaking bath. At the start and end of the culturing period, samples were taken. These were tested for optical density, pH and the different analytes (tested by NMR).

The results showed that in the production phase the amount of acetate decreased from 0.54 g/l to 0.03 g/l and the amount of ethanol decreased from 5.6 g/l to 4.9 g/l. Also, the concentration of butyric acid was increased from 0.05 g/l to 0.28 g/l and the concentration of hexanoic acid was increased from 0.03 g/l to 0.79 g/l.

Example 2

*Clostridium kluyven* Forming Hexanoic Acid from Butyic Acid and Ethanol

For the biotransformation of ethanol and butyric acid to hexanoic acid the bacterium *Clostridium kluyveri* was used. All cultivation steps were carried out under anaerobic conditions in pressure-resistant glass bottles that can be closed airtight with a butyl rubber stopper.

For the preculture 100 ml of DMSZ52 medium (pH=7.0; 10 g/L K-acetate, 0.31 g/L K$_2$HPO$_4$, 0.23 g/L KH$_2$PO$_4$, 0.25 g/l NH$_4$Cl, 0.20 g/l MgSO$_4$×7 H$_2$O, 1 g/L yeast extract, 0.50 mg/L resazurin, 10 µl/A HCl (25%, 7.7 M), 1.5 mg/L FeCl$_2$×4H$_2$O, 70 µg/L ZnCl$_2$×7H$_2$O, 100 µg/L MnCl$_2$×4H$_2$O, 6 µg/L H$_3$BO$_3$, 190 µg/L CoCl$_2$×6H$_2$O, 2 µg/L CuCl$_2$×6H$_2$O, 24 µg/L NiCl$_2$×6H$_2$O, 36 µg/L Na$_2$MO$_4$×2H$_2$O, 0.5 mg/L NaOH, 3 µg/L Na$_2$SeO$_3$×5H$_2$O, 4 µg/L Na$_2$WO$_4$×2H$_2$O, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-HClx2H$_2$O, 20 mVL ethanol, 2.5 g/L NaHCO$_3$, 0.25 g/L cysteine-HClxH$_2$O, 0.25 g/L Na$_2$Sx9H$_2$O) in a 250 ml bottle were inoculated with 5 ml of a frozen cryoculture of *Clostridium kluyver* and incubated at 37° C. for 144 h to an OD$_{600nm}$>0.3.

For the main culture 200 ml of fresh DMSZ52 medium in a 500 ml bottle were inoculated with centrifuged cells from the preculture to an OD$_{600nm}$ of 0.1. This growing culture was incubated at 37° C. for 25 h to an OD$_{600nm}$>0.4. Then the cell suspension was centrifuged, washed with production buffer (pH 6.16; 4.16 g/L K-acetate, 10.0 g/l ethanol) and centrifuged again.

For the production cultures, 200 ml of production buffer in a 500 ml bottle was inoculated with the washed cells from the main culture to an OD$_{600nm}$ of 0.2. In a first culture, at the beginning 1.0 g/l butyric acid was added to the production buffer, in a second culture, no butyric acid was added to the production buffer. The cultures were capped with a butyl rubber stopper and incubated for 71 h at 37° C. and 100 rpm in an open water shaking bath. At the start and end of the culturing period, samples were taken. These were tested for optical density, pH and the different analytes (tested by NMR).

The results showed that in the production phase of the butyric acid supplemented culture the amount of acetate decreased from 3.1 g/l to 1.1 g/l and the amount of ethanol decreased from 10.6 g/l to 7.5 g/l. Also, the concentration of butyric acid was increased from 1.2 g/l to 2.2 g/l and the concentration of hexanoic acid was increased from 0.04 g/l to 2.30 g/l.

In the production phase of the non-supplemented culture the amount of acetate decreased from 3.0 g/l to 1.3 g/l and the amount of ethanol decreased from 10.2 g/l to 8.2 g/l. Also, the concentration of butyric acid was increased from 0.1 g/l to 1.7 g/l and the concentration of hexanoic acid was increased from 0.01 g/l to 1.40 g/A.

Example 3

Cultivation of *Clostridium kluyver* in Presence of Decane and TOPO

The bacterium *Clostridium kluyver* was cultivated for the biotransformation of ethanol and acetate to hexanoic acid. For the inSitu extraction of the produced hexanoic acid a mixture of decane with trioctylphosphineoxide (TOPO) was added to the cultivation. All cultivation steps were carried out under anaerobic conditions in pressure-resistant glass bottles that can be closed airtight with a butyl rubber stopper.

For the preculture 250 ml of Veri01 medium (pH 7.0; 10 g/L potassium acetate, 0.31 g/L K$_2$HPO$_4$, 0.23 g/L KH$_2$PO$_4$, 0.25 g/L NH$_4$Cl, 0.20 g/L MgSO$_4$×7 H$_2$O, 10 µl/L HCl (7.7 M), 1.5 mg/L FeCl$_2$×4H$_2$O, 36 µg/L ZnCl$_2$, 64 µg/L MnCl$_2$×4H$_2$O, 6 µg/L H$_3$BO$_3$, 190 µg/L CoCl$_2$×6 H$_2$O, 1.2 µg/L CuCl$_2$×6H$_2$O, 24 µg/L NiO$_2$×6H$_2$O, 36 µg/L Na$_2$MO$_4$×2H$_2$O, 0.5 mg/L NaOH, 3 µg/L Na$_2$SeO$_3$×5H$_2$O, 4 µg/L Na$_2$WO$_4$×2H$_2$O, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-HClx2H$_2$O, 20 ml/L ethanol, 2.5 g/L NaHCO$_3$, 65 mg/L glycine, 24 mg/L histidine, 64.6 mg/L isoleucine, 93.8 mg/L leucine, 103 mg/L lysine, 60.4 mg/L arginine, 21.64 mg/L L-cysteine-HCl, 21 mg/L methionine, 52 mg/L praline, 56.8 mg/L serine, 59 mg/L threonine, 75.8 mg/L valine) were inoculated with 10 ml of a living culture of *Clostridium kluyver* to a start OD$_{600nm}$ of 0.1.

The cultivation was carried out in a 1000 mL pressure-resistant glass bottle at 37° C., 150 rpm and a ventilation rate of 1 L/h with 100% C02 in an open water bath shaker for 671 h. The gas was discharged into the headspace of the reactor. The pH was hold at 6.2 by automatic addition of 100 g/L NaOH solution. Fresh medium was continuously fed to the reactor with a dilution rate of 2.0 d$^{-1}$ and fermentation broth continuously removed from the reactor through a KrosFlo® hollow fibre polyethersulfone membrane with a pore size of 0.2 µm (Spectrumlabs, Rancho Dominguez, USA) to retain the cells in the reactor.

For the main culture 100 ml of fresh Veri01 medium in a 250 ml bottle was inoculated with centrifuged cells from the preculture to an OD$_{600nm}$ of 0.1. Additional 1 ml of a mixture of 6% (w/w) TOPO in decane was added. The culture was capped with a butyl rubber stopper and incubated at 37° C. and 150 rpm in an open water bath shaker for 43 h under 100% $CO_2$ atmosphere.

During cultivation several 5 mL samples were taken to determinate $OD_{600nm}$, pH und product formation. The determination of the product concentrations was performed by semi-quantitative 1H-NMR spectroscopy. As an internal quantification standard sodium trimethylsilylpropionate (T(M)SP) was used.

During the main cultivation the concentration of butyrate increased from 0.14 g/L to 2.12 g/L and the concentration of hexanoate increased from 0.22 g/L to 0.91 g/L, whereas the concentration of ethanol decreased from 15.04 to 11.98 g/l and the concentration of acetate decreased from 6.01 to 4.23 g/L.

The $OD_{600nm}$ decreased during this time from 0.111 to 0.076.

Example 4

Cultivation of *Clostridium kluyver* in Presence of Tetradecane and TOPO

The bacterium *Clostridium kluyver* was cultivated for the biotransformation of ethanol and acetate to hexanoic acid. For the inSitu extraction of the produced hexanoic acid a mixture of tetradecane with trioctylphosphineoxide (TOPO) was added to the cultivation. All cultivation steps were carried out under anaerobic conditions in pressure-resistant glass bottles that can be closed airtight with a butyl rubber stopper.

The precultivation of *Clostridium kluyver* was carried out in a 1000 mL pressure-resistant glass bottle in 250 ml of EvoDM24 medium (pH 5.5; 0.429 g/L Mg-acetate, 0.164 g/l Na-acetate, 0.016 g/L Ca-acetate, 2.454 g/l K-acetate, 0.107 mL/L $H_3PO_4$ (8.5%), 0.7 g/L $NH_4$ acetate, 0.35 mg/L Co-acetate, 1.245 mg/L Ni-acetate, 20 µg/L d-biotin, 20 µg/L folic acid, 10 µg/L pyridoxine-HCl, 50 µg/L thiamine-HCl, 50 µg/L Riboflavin, 50 µg/L nicotinic acid, 50 µg/L Ca-pantothenate, 50 µg/L Vitamin $B_{12}$, 50 µg/L p-aminobenzoate, 50 µg/L lipoic acid, 0.702 mg/L $(NH_4)_2Fe(SO_4)_2 \times 4H_2O$, 1 ml/L KS-acetate (93.5 mM), 20 mL/L ethanol, 0.37 g/L acetic acid) at 37° C., 150 rpm and a ventilation rate of 1 L/h with a mixture of 25% $CO_2$ and 75% $N_2$ in an open water bath shake. The gas was discharged into the headspace of the reactor. The pH was hold at 5.5 by automatic addition of 2.5 M $NH_3$ solution. Fresh medium was continuously feeded to the reactor with a dilution rate of 2.0 $d^{-1}$ and fermentation broth continuously removed from the reactor through a KrosFloe hollow fibre polyethersulfone membrane with a pore size of 0.2 µm (Spectrumlabs, Rancho Dominguez, USA) to retain the cells in the reactor and hold an $OD_{600nm}$ of ~1.5.

For the main culture 100 ml of Veri01 medium (pH 6.5; 10 g/L potassium acetate, 0.31 g/L K2HPO4, 0.23 g/L $KH_2PO_4$, 0.25 g/L $NH_4Cl$, 0.20 g/L $MgSO_4 \times 7 H_2O$, 10 µl/L HCl (7.7 M), 1.5 mg/L $FeCl_2 \times 4 H_2O$, 36 µg/L $ZnCl_2$, 64 µg/L $MnCl_2 \times 4 H_2O$, 6 µg/L $H_3BO_3$, 190 µg/L $COC_2 \times 6 H_2O$, 1.2 µg/L $CuCl_2 \times 6 H_2O$, 24 µg/L $NiCl_2 \times 6 H_2O$, 36 µg/L $Na_2MO_4 \times 2 H_2O$, 0.5 mg/L NaOH, 3 µg/L $Na_2SeO_3 \times 5 H_2O$, 4 µg/L $Na_2WO_4 \times 2 H_2O$, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-HCl×2H₂O, 20 ml/L ethanol, 2.5 g/L $NaHCO_3$, 65 mg/L glycine, 24 mg/L histidine, 64.6 mg/L isoleucine, 93.8 mg/L leucine, 103 mg/L lysine, 60.4 mg/L arginine, 21.64 mg/L L-cysteine-HCl, 21 mg/L methionine, 52 mg/L proline, 56.8 mg/L serine, 59 mg/L threonine, 75.8 mg/L valine, 2.5 mL/L HCL 25%) in a 250 ml bottle were inoculated with centrifuged cells from the preculture to an $OD_{600nm}$ of 0.1. Additional 1 ml of a mixture of 6% (w/w) TOPO in tetradecane was added. The culture was capped with a butyl rubber stopper and incubated at 37° C. and 150 rpm in an open water bath shaker for 47 h under 100% C02 atmosphere.

During cultivation several 5 mL samples were taken to determinate $OD_{600nm}$, pH und product formation. The determination of the product concentrations was performed by semiquantitative 1H-NMR spectroscopy. As an internal quantification standard sodium trimethylsilylpropionate (T(M)SP) was used.

During the main cultivation the concentration of butyrate increased from 0.05 g/L to 3.78 g/L and the concentration of hexanoate increased from 0.09 g/L to 4.93 g/L, whereas the concentration of ethanol decreased from 15.52 to 9.36 g/l and the concentration of acetate decreased from 6.36 to 2.49 g/L.

The $OD_{600nm}$ increased during this time from 0.095 to 0.685.

Example 5

Cultivation of *Clostridium kluyver* in Presence of Hexadecane and TOPO

The bacterium *Clostridium kluyver* was cultivated for the biotransformation of ethanol and acetate to hexanoic acid. For the inSitu extraction of the produced hexanoic acid a mixture of hexadecane with trioctylphosphineoxide (TOPO) was added to the cultivation. All cultivation steps were carried out under anaerobic conditions in pressure-resistant glass bottles that can be dosed airtight with a butyl rubber stopper.

For the preculture 250 ml of Veri01 medium (pH 7.0; 10 g/L potassium acetate, 0.31 g/L $K_2HPO_4$, 0.23 g/L $KH_2PO_4$, 0.25 g/L $NH_4Cl$, 0.20 g/L $MgSO_4 \times 7 H_2O$, 10 µl/L HCl (7.7 M), 1.5 mg/L $FeCl_2 \times 4 H_2O$, 36 µg/L $ZnCl_2$, 64 µg/L $MnCl_2 \times 4 H_2O$, 6 µg/L $H_3BO_3$, 190 µg/L $COCl_2 \times 6 H_2O$, 1.2 µg/L $CuCl_2 \times 6 H_2O$, 24 µg/L $NiCl_2 \times 6 H_2O$, 36 µg/l $Na_2MO_4 \times 2 H_2O$, 0.5 mg/L NaOH, 3 µg/L $Na_2SeO_3 \times 5 H_2O$, 4 µg/L $Na_2WO_4 \times 2 H_2O$, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-HCl×2H₂O, 20 ml/L ethanol, 2.5 g/L $NaHCO_3$, 65 mg/L glycine, 24 mg/L histidine, 64.6 mg/L isoleucine, 93.8 mg/L leucine, 103 mg/L lysine, 60.4 mg/L arginine, 21.64 mg/L L-cysteine-HCl, 21 mg/L methionine, 52 mg/L proline, 56.8 mg/L serine, 59 mg/L threonine, 75.8 mg/L valine) were inoculated with 10 ml of a living culture of *Clostridium kluyveri* to a start $OD_{600nm}$ of 0.1.

The cultivation was carried out in a 1000 mL pressure-resistant glass bottle at 37° C., 150 rpm and a ventilation rate of 1 L/h with 100% C02 in an open water bath shaker for 671 h. The gas was discharged into the headspace of the reactor. The pH was hold at 6.2 by automatic addition of 100 g/L NaOH solution. Fresh medium was continuously fed to the reactor with a dilution rate of 2.0 $d^{-1}$ and fermentation broth continuously removed from the reactor through a KrosFloe hollow fibre polyethersulfone membrane with a pore size of 0.2 µm (Spectrumlabs, Rancho Dominguez, USA) to retain the cells in the reactor.

For the main culture 100 ml of fresh Veri01 medium in a 250 ml bottle was inoculated with centrifuged cells from the preculture to an $OD_{600nm}$ of 0.1. Additional 1 ml of a mixture of 6% (w/w) TOPO in hexadecane was added. The culture was capped with a butyl rubber stopper and incubated at 37° C. and 150 rpm in an open water bath shaker for 43 h under 100% C02 atmosphere.

During cultivation several 5 mL samples were taken to determinate $OD_{600nm}$, pH und product formation. The determination of the product concentrations was performed by semi-quantitative 1H-NMR spectroscopy. As an internal quantification standard sodium trimethylsilylpropionate (T(M)SP) was used.

During the main cultivation the concentration of butyrate increased from 0.14 g/L to 2.86 g/L and the concentration of hexanoate increased from 0.20 g/L to 2.37 g/L, whereas the concentration of ethanol decreased from 14.59 to 10.24 g/l and the concentration of acetate decreased from 5.87 to 3.32 g/L.

The $OD_{600nm}$ increased during this time from 0.091 to 0.256.

Example 6

Cultivation of *Clostridium kluyver* in Presence of Heptadecane and TOPO

The bacterium *Clostridium kluyver* was cultivated for the biotransformation of ethanol and acetate to hexanoic acid. For the inSitu extraction of the produced hexanoic acid a mixture of heptadecane with trioctylphosphineoxide (TOPO) was added to the cultivation. All cultivation steps were carried out under anaerobic conditions in pressure-resistant glass bottles that can be dosed airtight with a butyl rubber stopper.

For the preculture 250 ml of Veri01 medium (pH 7.0; 10 g/L potassium acetate, 0.31 g/L $K_2HPO_4$, 0.23 g/L $KH_2PO_4$, 0.25 g/L $NH_4Cl$, 0.20 g/L $MgSO_4 \times 7\ H_2O$, 10 µl/L HCl (7.7 M), 1.5 mg/L $FeCl_2 \times 4\ H_2O$, 36 µg/L $ZnCl_2$, 64 µg/L $MnCl_2 \times 4\ H_2O$, 6 µg/L $H_3BO_3$, 190 µg/L $CoCl_2 \times 6\ H_2O$, 1.2 µg/L $CuCl_2 \times 6\ H_2O$, 24 µg/L $NiCl_2 \times 6\ H_2O$, 36 µg/L $Na_2MO_4 \times 2\ H_2O$, 0.5 mg/L NaOH, 3 µg/L $Na_2SeO_3 \times 5\ H_2O$, 4 µg/L $Na_2WO_4 \times 2\ H_2O$, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-$HCl \times 2H_2O$, 20 ml/L ethanol, 2.5 g/L $NaHCO_3$, 65 mg/L glycine, 24 mg/L histidine, 64.6 mg/L isoleucine, 93.8 mg/L leucine, 103 mg/L lysine, 60.4 mg/L arginine, 21.64 mg/L L-cysteine-HCl, 21 mg/L methionine, 52 mg/L proline, 56.8 mg/L serine, 59 mg/L threonine, 75.8 mg/L valine) were inoculated with 10 ml of a living culture of *Clostridium kluyveri* to a start $OD_{600nm}$ of 0.1.

The cultivation was carried out in a 1000 mL pressure-resistant glass bottle at 37° C., 150 rpm and a ventilation rate of 1 L/h with 100% C02 in an open water bath shaker for 671 h. The gas was discharged into the headspace of the reactor. The pH was hold at 6.2 by automatic addition of 100 g/L NaOH solution. Fresh medium was continuously feeded to the reactor with a dilution rate of 2.0 d- and fermentation broth continuously removed from the reactor through a KrosFloe hollow fibre polyethersulfone membrane with a pore size of 0.2 µm (Spectrumlabs, Rancho Dominguez, USA) to retain the cells in the reactor.

For the main culture 100 ml of fresh Veri01 medium in a 250 ml bottle were inoculated with centrifuged cells from the preculture to an $OD_{600nm}$ of 0.1. Additional 1 ml of a mixture of 6% (w/w) TOPO in heptadecane was added. The culture was capped with a butyl rubber stopper and incubated at 37° C. and 150 rpm in an open water bath shaker for 43 h under 100% C02 atmosphere.

During cultivation several 5 mL samples were taken to determinate $OD_{600nm}$, pH und product formation. The determination of the product concentrations was performed by semiquantitative 1H-NMR spectroscopy. As an internal quantification standard sodium trimethylsilylpropionate (T(M)SP) was used.

During the main cultivation the concentration of butyrate increased from 0.15 g/L to 2.82 g/L and the concentration of hexanoate increased from 0.19 g/L to 2.85 g/L, whereas the concentration of ethanol decreased from 14.34 to 9.58 g/l and the concentration of acetate decreased from 5.88 to 3.20 g/L.

The $OD_{600nm}$ increased during this time from 0.083 to 0.363.

Example 7

Cultivation of *Clostridium kluyveri* in Presence of Dodecane and TOPO

The bacterium *Clostridium kluyveri* was cultivated for the biotransformation of ethanol and acetate to hexanoic acid. For the inSitu extraction of the produced hexanoic acid a mixture of dodecane with trioctylphosphineoxide (TOPO) was added to the cultivation. All cultivation steps were carried out under anaerobic conditions in pressure-resistant glass bottles that can be closed airtight with a butyl rubber stopper.

For the preculture 250 ml of Veri01 medium (pH 7.0; 10 g/L potassium acetate, 0.31 g/L $K_2HPO_4$, 0.23 g/L $KH_2PO_4$, 0.25 g/L $NH_4Cl$, 0.20 g/L $MgSO_4 \times 7\ H_2O$, 10 µl/L HCl (7.7 M), 1.5 mg/L $FeCl_2 \times 4\ H_2O$, 36 µg/L $ZnCl_2$, 64 µg/L $MnCl_2 \times 4\ H_2O$, 6 µg/L $H_3BO_3$, 190 µg/L $COCl_2 \times 6\ H_2O$, 1.2 µg/L $CuCl_2 \times 6\ H_2O$, 24 µg/L $NiCl_2 \times 6\ H_2O$, 36 µg/L $Na_2MO_4 \times 2\ H_2O$, 0.5 mg/L NaOH, 3 µg/L $Na_2SeO_3 \times 5\ H_2O$, 4 µg/L $Na_2WO_4 \times 2\ H_2O$, 100 µg/L vitamin B12, 80 µg/L p-aminobenzoic acid, 20 µg/L D(+) Biotin, 200 µg/L nicotinic acid, 100 µg/L D-Ca-pantothenate, 300 µg/L pyridoxine hydrochloride, 200 µg/l thiamine-$HCl \times 2H_2O$, 20 ml/L ethanol, 2.5 g/L $NaHCO_3$, 65 mg/L glycine, 24 mg/L histidine, 64.6 mg/L isoleucine, 93.8 mg/L leucine, 103 mg/L lysine, 60.4 mg/L arginine, 21.64 mg/L L-cysteine-HCl, 21 mg/L methionine, 52 mg/L proline, 56.8 mg/L serine, 59 mg/L threonine, 75.8 mg/L valine) were inoculated with 10 ml of a living culture of *Clostridium kluyveri* to a start $OD_{600nm}$ of 0.1.

The cultivation was carried out in a 1000 mL pressure-resistant glass bottle at 37° C., 150 rpm and a ventilation rate of 1 L/h with 100% C02 in an open water bath shaker for 671 h. The gas was discharged into the headspace of the reactor. The pH was hold at 6.2 by automatic addition of 100 g/L NaOH solution. Fresh medium was continuously feeded to the reactor with a dilution rate of 2.0 d- and fermentation broth continuously removed from the reactor through a KrosFloe hollow fibre polyethersulfone membrane with a pore size of 0.2 µm (Spectrumlabs, Rancho Dominguez, USA) to retain the cells in the reactor.

For the main culture 100 ml of fresh Veri01 medium in a 250 ml bottle were inoculated with centrifuged cells from the preculture to an $OD_{600nm}$ of 0.1. Additional 1 ml of a mixture of 6% (w/w) TOPO in dodecane was added. The culture was capped with a butyl rubber stopper and incubated at 37° C. and 150 rpm in an open water bath shaker for 43 h under 100% C02 atmosphere.

During cultivation several 5 mL samples were taken to determinate $OD_{600nm}$, pH und product formation. The determination of the product concentrations was performed by semiquantitative 1H-NMR spectroscopy. As an internal quantification standard sodium trimethylsilylpropionate (T(M)SP) was used.

During the main cultivation the concentration of butyrate increased from 0.14 g/L to 2.62 g/L and the concentration of hexanoate increased from 0.22 g/L to 2.05 g/L, whereas the concentration of ethanol decreased from 14.62 to 10.64 g/l and the concentration of acetate decreased from 5.92 to 3.54 g/L.

The $OD_{600nm}$ increased during this time from 0.091 to 0.259.

Example 8

Determination of the Distribution Coefficient for Hexanoic Acid Between Water and a Mixture of Hexadecane and TOPO During all stages of the experiment, samples from both phases were taken for determination of pH and concentration of hexanoic acid by high performance liquid chromatography (HPLC). 100 g of an aqueous solution of 5 g/kg hexanoic acid and 33 g of a mixture of 6% trioctylphosphinoxide (TOPO) in hexadecane were filled in a separatory funnel and mixed for 1 minute at 37° C. Then the funnel was placed in a tripod ring and the emulsion was left to stand to separate spontaneously. The pH of the aqueous phase was measured. Then 1M NaOH solution was added to the funnel and mixed. The step of separation and sampling was repeated until a pH of 6.2 in the aqueous phase was reached. Samples from both phases were taken for later analysis at this point. The aqueous phase could be analyzed directly by HPLC. For the analysis of the organic phase the diluted hexanoic acid was first re-extracted to water (pH 12.0 by addition of 1 M NaOH) and then analyzed by HPLC. The distribution coefficient $K_D$ of hexanoic acid in the system of water and 6% TOPO in hexadecane was calculated from the concentrations of hexanoic acid in both phases.

$$K(D) = \frac{c(Hex, \text{ organic phase})}{c(Hex, \text{ aqueous phase})}$$

The $K_D$ for hexanoic acid in the system of water and 6% TOPO in hexadecane at pH 6.2 was 4.7.

Example 9

Determination of the Distribution Coefficient for Hexanoic Acid Between Water and a Mixture of Heptadecane and TOPO During all stages of the experiment, samples from both phases were taken for determination of pH and concentration of hexanoic acid by high performance liquid chromatography (HPLC). 100 g of an aqueous solution of 5 g/kg hexanoic acid and 33 g of a mixture of 6% trioctylphosphinoxide (TOPO) in heptadecane were filled in a separatory funnel and mixed for 1 minute at 37° C. Then the funnel was placed in a tripod ring and the emulsion was left to stand to separate spontaneously. The pH of the aqueous phase was measured. 1M NaOH solution was added to the funnel and mixed. The step of separation and sampling was repeated until a pH of 6.2 in the aqueous phase was reached. Samples from both phases were taken for later analysis at this point. The aqueous phase could be analyzed directly by HPLC. For the analysis of the organic phase the diluted hexanoic acid was first re-extracted to water (pH 12.0 by addition of 1 M NaOH) and then analyzed by HPLC. The distribution coefficient $K_D$ of hexanoic acid in the system of water and 6% TOPO in heptadecane was calculated from the concentrations of hexanoic acid in both phases.

$$K(D) = \frac{c(Hex, \text{ organic phase})}{c(Hex, \text{ aqueous phase})}$$

The $K_D$ for hexanoic acid in the system water and 6% TOPO in heptadecane at pH 6.2 was 5.0.

Example 10

Determination of the Distribution Coefficient for Hexanoic Acid Between Water and a Mixture of Tetradecane and TOPO During all stages of the experiment, samples from both phases were taken for determination of pH and concentration of hexanoic acid by high performance liquid chromatography (HPLC). 130 g of an aqueous solution of 5 g/kg hexanoic acid plus 0.5 g/kg acetic acid and 15 g of a mixture of 6% trioctylphosphinoxid (TOPO) in tetradecane were filled in a separatory funnel and mixed for 1 minute at 37° C. Then the funnel was placed in a tripod ring and the emulsion was led stand to separate spontaneously. The pH of the aqueous phase was measured. 1M NaOH solution was added to the funnel and mixed. The step of separation and sampling was repeated until a pH of 6.2 in the aqueous phase was reached. Samples from both phases were taken for later analysis at this point. The aqueous phase could be analyzed directly by HPLC. For the analysis of the organic phase the diluted hexanoic acid was first re-extracted to water (pH 12.0 by addition of 1 M NaOH) and then analyzed by HPLC. The distribution coefficient $K_D$ of hexanoic acid in the system water and 6% TOPO in tetradecane was calculated from the concentrations of hexanoic acid in both phases.

$$K(D) = \frac{c(Hex, \text{ organic phase})}{c(Hex, \text{ aqueous phase})}$$

The $K_D$ for hexanoic acid in the system water and 6% TOPO in tetradecane at pH 6.9 was 1.3.

Example 11

Cultivation of *Clostridium kluyven* with inSitu Extraction of Hexanoic Acid

The bacterium *Clostridium kluyveri* was cultivated for the biotransformation of ethanol and acetate to hexanoic acid. For the inSitu extraction of the produced hexanoic acid a mixture of tetradecane with trioctylphosphineoxide (TOPO) was continuously passed through the cultivation. All cultivation steps were carried out under anaerobic conditions in pressure-resistant glass bottles that can be closed airtight with a butyl rubber stopper.

The precultivation of *Clostridium kluyveri* was carried out in a 1000 mL pressure-resistant glass bottle in 250 ml of EvoDM45 medium (pH 5.5; 0.004 g/L Mg-acetate, 0.164 g/l Na-acetate, 0.016 g/L Ca-acetate, 0.25 g/l K-acetate, 0.107 ml/L $H_3PO_4$ (8.5%), 2.92 g/L $NH_4$acetate, 0.35 mg/L Co-acetate, 1.245 mg/L Ni-acetate, 20 µg/L d-biotin, 20 µg/L folic acid, 10 µg/L pyridoxine-HCl, 50 µg/L thiamine-HCl, 50 µg/L Riboflavin, 50 µg/L nicotinic acid, 50 µg/L Ca-pantothenate, 50 µg/L Vitamin B12, 50 µg/L p-aminobenzoate, 50 µg/L lipoic acid, 0.702 mg/L $(NH_4)_2Fe(SO_4)_2 \times 4$ $H_2O$, 1 ml/L KS-acetate (93.5 mM), 20 ml/L ethanol, 0.37 g/L acetic acid) at 37° C., 150 rpm and a ventilation rate of 1 Uh with a mixture of 25% $CO_2$ and 75% $N_2$ in an open water bath shaker. The gas was discharged into the headspace of the reactor. The pH was hold at 5.5 by automatic addition of 2.5 M $NH_3$ solution. Fresh medium was continuously fed to the reactor with a dilution rate of 2.0 $d^{-1}$ and fermentation broth continuously removed from the reactor through a KrosFloe hollow fibre polyethersulfone membrane with a pore size of 0.2 µm (Spectrumlabs, Rancho Dominguez, USA) to retain the cells in the reactor and hold an $OD_{600nm}$ of ~1.5.

For the main culture 150 ml of EvoDM39 medium (pH 5.8; 0.429 g/L Mg-acetate, 0.164 g/l Na-acetate, 0.016 g/L Ca-acetate, 2.454 g/l K-acetate, 0.107 ml/L $H_3PO_4$ (8.5%), 1.01 ml/L acetic acid, 0.35 mg/L Co-acetate, 1.245 mg/L Ni-acetate, 20 µg/L d-biotin, 20 µg/L folic acid, 10 µg/L pyridoxine-HCl, 50 µg/L thiamine-HCl, 50 µg/L Riboflavin, 50 µg/L nicotinic acid, 50 µg/L Ca-pantothenate, 50 µg/L Vitamin B12, 50 µg/L p-aminobenzoate, 50 µg/L lipoic acid, 0.702 mg/L $(NH_4)_2Fe(SO_4)_2 \times 4$ $H_2O$, 1 ml/L KS-acetate (93.5 mM), 20 ml/L ethanol, 8.8 mL $NH_3$ solution (2.5 mol/L), 27.75 ml/L acetic acid (144 g/L)) in a 1000 ml bottle were inoculated with 100 ml cell broth from the preculture to an $OD_{600nm}$ of 0.71.

The cultivation was carried out at 37° C., 150 rpm and a ventilation rate of 1 Uh with a mixture of 25% $CO_2$ and 75% $N_2$ in an open water bath shaker for 65 h. The gas was discharged into the headspace of the reactor. The pH was hold at 5.8 by automatic addition of 2.5 M $NH_3$ solution. Fresh medium was continuously fed to the reactor with a dilution rate of 0.5 $d^{-1}$ and fermentation broth continuously removed from the reactor by holding an $OD_{600nm}$ of ~0.5. Additional 120 g of a mixture of 6% (w/w) TOPO in tetradecane was added to the fermentation broth. Then this organic mixture was continuously fed to the reactor and the organic phase also continuously removed from the reactor with a dilution rate of 1 $d^{-1}$.

During cultivation several 5 mL samples from both, the aqueous and the organic phase, were taken to determinate $OD_{600nm}$, pH und product formation. The determination of the product concentrations was performed by semiquantitative 1H-NMR spectroscopy. As an internal quantification standard sodium trimethylsilylpropionate (T(M)SP) was used.

During the main cultivation in the aqueous phase a steady state concentration of 8.18 g/L ethanol, 3.20 g/L acetate, 1.81 g/L butyrate and 0.81 g/L hexanoate was reached. The $OD_{600nm}$ remained stable at 0.5. In the organic phase a steady state concentration of 0.43 g/kg ethanol, 0.08 g/kg acetate, 1.13 g/kg butyrate and 8.09 g/kg hexanoate was reached. After the experiment the cells remained viable while transferred to further cultivations.

The distribution coefficient $K_D$ of the substrates and products in the system aqueous medium and 6% TOPO in tetradecane was calculated from the concentrations in both phases.

$$K(D) = \frac{c(\text{organic phase})}{c(\text{aqueous phase})}$$

The $K_D$ in the steady state was 0.05 for ethanol, 0.03 for acetic acid, 0.62 for butyric acid and 9.99 for hexanoic acid.

Example 12

Ketonization of Hexanoic Acid

The ketonization was conducted in a heated continuous flow-bed reactor. At first, the reactor was charged with magnesium oxide on silica (50 wt. %, 14.00 g) and heated under an argon flow (54 m/min) at 330° C. for one hour. The temperature was raised to 360° C. Than a mixture of hexanoic acid in tetradecane (v/v: 3/1) was continuously fed to the reactor with a rate of 3.3 mL/h. The gaseous out stream was collected by two cooling traps, which were cooled with water and a mixture of dry ice and isopropanol. The collected fractions were weighted and analyzed by gas chromatography (GC) for their composition. In total, 370.65 g of hexanoic acid was fed to the reactor, which equals to a maximum theoretical yield of 271.70 g of 6-undecanone and 28.75 g of water and 70.21 g of carbon dioxide as by-products. The obtained amount of 6-undecanone was 267.67 g and the amount of water was 28.32 g. This corresponds to a 99% mass recovery at full conversion. The high productivity and selectivity were confirmed by regular GC measurements, as only traces of hexanoic acid and no side-products were detected.

Example 13

Cross Ketonization of Hexanoic Acid with Palmitic Acid.

The technical procedure of the cross ketonization is identical to the sole ketonization of hexanoic acid (example 12) except the composition of the substrate feed. The feed consists of hexanoic acid (116.16 g, 1.00 mol) and palmitic acid (256.43 g, 1.00 mol) as substrates and tetradecane (124.20 g) as internal standard. The substrate feed is added with a rate of 3.3 mL/h and reacted at a temperature of 360° C. The presence of two alkanoic acids leads two a product mixture of three ketones: 6-undecanone, 6-henicosanone and 16-hentriacontanone. At full conversion, the amounts obtained are 42.58 g of 6-undecanone, 155.29 g of 6-henicosanone and 112.71 g of 16-hentriacontanone.

Example 14

Cross Ketonization of Hexanoic Acid with Acetic Acid.

The technical procedure of the cross ketonization is identical to the sole ketonization of hexanoic acid (example 12) except the composition of the substrate feed. The feed consists of hexanoic acid 232.32 g, 2.00 mol) and acetic acid (120.10 g, 2.00 mol) as substrates and tetradecane (117.47 g) as internal standard. The substrate feed is added with a rate of 3.3 mL/h and reacted at a temperature of 360° C. The presence of two alkanoic acids leads two a product mixture of three ketones: 2-propanone, 2-heptanone and 6-undecanone. At full conversion, the amounts obtained are 29.04 g of 2-propanone, 114.19 g of 2-heptanone and 85.15 g of 6-undecanone.

The invention claimed is:
1. A method of producing one or more higher alkanones, the method comprising:
 (a') producing ethanol and/or acetate from a synthesis gas comprising at least one selected from the group consisting of CO and $CO_2$ in a presence of at least one acetogenic bacteria;
 (a) contacting the ethanol and/or acetate with at least one microorganism capable of carrying out carbon chain elongation to produce hexanoic acid and/or a hexanoic acid ester from the ethanol and/or acetate;

(b) in situ extracting of the hexanoic acid and/or ester from the contacting (a) using at least one extractant in an aqueous medium, wherein the extractant comprises an alkyl-phosphine oxide and an alkane comprising at least 12 carbon atoms; or wherein the extractant comprises a trialkylamine and an alkane comprising at least 12 carbon atoms; and (c) contacting the extracted hexanoic acid and/or ester from the extracting (b) with at least one ketonization catalyst and optionally a further alkanoic acid comprising 1 to 22 carbon atoms under suitable reaction conditions for chemical ketonization of hexanoic acid and optionally the further alkanoic acid to a higher alkenone, wherein the at least one microorganism is grown in a mixture of the aqueous medium and the extractant during step (b), wherein after step (b) the aqueous medium comprising the at least one microorganism is recycled back into step (a), wherein the at least one microorganism is in direct contact with the ethanol and/or acetate during step (a) and are not immobilized or separated by a membrane.

2. The method of claim 1, wherein the ketonization catalyst of step (c) is a metal oxide catalyst or mixtures of metal oxide catalysts.

3. The method of claim 1, wherein the metal oxide catalyst is at least one selected from the group consisting of heteropoly acid ($H_3PW_{12}O_{40}$) catalyst, titanium oxide ($TiO_2$) catalyst, cerium oxide ($CeO_2$) catalyst, zinc-chromium (Zn—Cr) mixed oxide catalyst, manganese oxide ($MnO_2$) catalyst, lanthanum oxide ($La_2O_3$) catalyst, magnesium oxide (MgO) catalyst, iron oxide ($FeO$, $FeO_2$, $Fe_2O_3$, $Fe_3O_4$, $Fe_4O_5$, $Fe_5O_6$, $Fe_5O_7$), silicon-aluminium (Si—Al) mixed oxide catalyst, and/or zirconia ($ZrO_2$) catalyst.

4. The method of claim 1, wherein the ketonization catalyst is a zirconia aerogel catalyst.

5. The method of claim 1, wherein the suitable reaction conditions of the contacting (c) comprise a reaction temperature in a range from 150° C.-350° C.

6. The method of claim 1, wherein the microorganism in the contacting (a) is selected from the group consisting of *Clostridium carboxidivorans* and *Clostridium kluyveri*.

7. The method of claim 1, wherein the alkyl-phosphine oxide is at least one selected from the group consisting of trioctylphosphine oxide, hexylphosphine oxide, and octylphosphine oxide, and wherein the alkane is at least one selected from the group consisting of pentadecane, hexadecane, heptadecane, octadecane, and tetradacane.

8. The method of claim 1, wherein the alkyl-phosphine oxide is trioctylphosphine oxide (TOPO), and wherein the alkane is tetradacane.

9. The method of claim 8, wherein the weight ratio of TOPO to tetradacane is in a range from 1:100 to 1:10.

10. The method of claim 1, wherein a pH of the aqueous medium in the extracting (b) is maintained in a range from 5.5 to 8.

11. A method of producing one or more higher alkanols, the method comprising:

conducting the method of claim 1, to obtain the higher alkanone(s); and (d) contacting the higher alkanone(s) with at least one hydrogenation metal catalyst suitable for catalytic hydrogenation of the higher alkanone(s), to one or more higher alkanols.

12. The method of claim 11, wherein the hydrogenation metal catalyst is at least one selected from the group consisting of ruthenium (Ru) catalyst, rhenium (Re) catalyst, nickel (Ni) catalyst, iron (Fe), cobalt (Co), and platinum (Pt) catalyst.

13. A method of producing one or more alkanoic acids, the method comprising:

conducting the method of claim 11, to obtain higher alkanol(s); and (e) contacting the higher alkanol(s) with $CO_2$ and a homogeneous carboxylation catalyst capable of carboxylation of the higher alkanol(s) to at least one alkanoic acid.

14. The method of claim 13, wherein the contacting (e) comprises either:

(ei) contacting the higher alkanol(s) with at least one nickel catalyst and carbon dioxide at atmospheric pressure for carboxylation of the higher alkanol(s) to higher alkanoic acid(s); or (eii) contacting the higher alkanol(s) $CO_2$ and a homogeneous Rh catalyst suitable for carboxylation of the higher alkanol(s) to higher alkanoic acid(s).

15. The method of claim 1, wherein the extractant is recycled.

16. The method of claim 1, wherein the one or more higher alkanones comprise 6-undecanone.

17. The method of claim 1, wherein the one or more higher alkanones are made from the ethanol.

18. The method of claim 1, wherein the one or more higher alkanones are made from the acetate.

19. The method of claim 1, wherein the synthesis gas comprises an $N_2$ concentration of 50% by weight or less.

20. The method of claim 1, wherein the acetogenic bacteria is at least one selected from the group consisting of *Acetoanaerobium notera, Acetonema longum, Acetobacterium carbinolicum, Acetobacterium malicum, Acetobacterium* species no. 446, *Acetobacterium wieringae, Acetobacterium woodii, Alkalibaculum bacchi Archaeoglobus fulgidus, Blautia producta, Butyribacterium methylotrophicum, Clostridium aceticum, Clostridium autoethanogenum, Clostridium carboxidivorans, Clostridium coskatii, Clostridium drakei, Clostridium formicoaceticum, Clostridium glycolicum Clostridium ljungdahlii, Clostridium ljungdahlii C-01, Clostridium ljungdahlii ERI-2, Clostridium ljungdahlii O-52, Clostridium mayombei, Clostridium kluyveri, Clostridium mayombei, Clostridium methoxybenzovorans, Clostridium ragsdalei, Clostridium scatologenes, Clostridium* species ATCC 29797, *Desulfotomaculum kuznetsovii, Desulfotomaculum thermobezoicum* subsp. *thermosyntrophicum, Eubacterium limosum, Methanosarcina acetivorans C2A, Moorella* sp. HUC22-1, *Moorella thermoacetica, Moorella thermoautotrophica, Oxobacter pfennigii, Sporomusa aerivorans, Sporomusa ovata, Sporomusa silvacetica, Sporomusa sphaeroides, Sporomusa termitida*, and *Thermoanaerobacter kivui*.

* * * * *